United States Patent
Ishihara et al.

(10) Patent No.: US 10,958,806 B2
(45) Date of Patent: Mar. 23, 2021

(54) PRINTING APPARATUS

(71) Applicant: CANON KABUSHIKI KAISHA, Tokyo (JP)

(72) Inventors: Masaaki Ishihara, Tokyo (JP); Yasushi Ishida, Tokyo (JP); Toshiya Matsumoto, Yokohama (JP); Mitsuyuki Fujibayashi, Kawasaki (JP); Haruo Uchida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/050,683

(22) Filed: Jul. 31, 2018

(65) Prior Publication Data
US 2019/0052766 A1 Feb. 14, 2019

(30) Foreign Application Priority Data
Aug. 8, 2017 (JP) .............................. JP2017-153709

(51) Int. Cl.
*H04N 1/10* (2006.01)
*H04N 1/00* (2006.01)

(52) U.S. Cl.
CPC ....... *H04N 1/1039* (2013.01); *H04N 1/00615* (2013.01); *H04N 1/1065* (2013.01)

(58) Field of Classification Search
None
See application file for complete search history.

(56) References Cited

U.S. PATENT DOCUMENTS

| | | | | |
|---|---|---|---|---|
| 4,699,034 A | * | 10/1987 | Sue ......................... | B41J 15/042 242/564 |
| 4,914,525 A | * | 4/1990 | Abe ................... | H04N 1/00519 292/109 |
| 5,113,224 A | * | 5/1992 | Tsuda .................... | F16H 19/043 399/213 |
| 5,486,259 A | * | 1/1996 | Goodwin ................... | B41J 3/36 156/384 |
| 5,541,712 A | * | 7/1996 | Fujitaka ............... | G03G 15/602 399/125 |

(Continued)

FOREIGN PATENT DOCUMENTS

| | | |
|---|---|---|
| JP | H11-84982 A | 3/1999 |
| JP | 2001-266560 A | 9/2001 |

(Continued)

OTHER PUBLICATIONS

Japanese Office Action, dated Mar. 3, 2020, in corresponding Japanese Application No. 2017153709.

*Primary Examiner* — Ahn-Vinh T Nguyen
(74) *Attorney, Agent, or Firm* — Venable LLP

(57) ABSTRACT

An object of the present invention is to provide a printing apparatus including a scanner unit openable and closable with respect to a printer body unit for simultaneously achieving smooth opening/closing movement and the downsizing of the apparatus. The printing apparatus includes a first gear member provided in the printer body unit and a second gear member which is attached to the scanner unit so as to be swingable with respect to the scanner unit and which is in mesh with the first gear member. When the scanner unit opens or closes with respect to the printer body unit, the second gear member swings with respect to the scanner unit while retaining a meshing state with the first gear member.

30 Claims, 22 Drawing Sheets

(56) References Cited

U.S. PATENT DOCUMENTS

| | | | |
|---|---|---|---|
| 5,743,518 A * | 4/1998 | Takashimizu | B65H 29/14 271/176 |
| 5,864,410 A * | 1/1999 | McVicar | H04N 1/1215 358/474 |
| 5,887,867 A * | 3/1999 | Takahashi | B65H 1/08 271/117 |
| 5,905,926 A * | 5/1999 | Taniguchi | H04N 1/00543 399/107 |
| 5,956,161 A * | 9/1999 | Takashimizu | H04N 1/00567 358/496 |
| 6,328,412 B1 * | 12/2001 | Taylor | B41J 2/16547 347/22 |
| 7,431,284 B2 * | 10/2008 | Gaarder | B65H 3/06 271/114 |
| 9,372,513 B1 * | 6/2016 | Riddiford | G06F 1/1681 |
| 9,849,601 B2 * | 12/2017 | Anayama | B26D 1/245 |
| 10,025,259 B2 | 7/2018 | Doi et al. | |
| 10,093,497 B2 * | 10/2018 | Zensai | B65H 3/0669 |
| 10,191,443 B2 * | 1/2019 | Iwase | G03G 21/1633 |
| 2002/0074711 A1 * | 6/2002 | Higaki | B65H 3/0615 271/117 |
| 2003/0056324 A1 * | 3/2003 | Yazawa | E05F 1/1075 16/289 |
| 2004/0145112 A1 * | 7/2004 | Matsutomo | B65H 29/14 271/207 |
| 2004/0164196 A1 * | 8/2004 | Sato | G03B 27/462 242/332.7 |
| 2006/0033256 A1 * | 2/2006 | Kobayashi | B42C 1/12 270/58.08 |
| 2006/0083564 A1 * | 4/2006 | Yazawa | B41J 29/023 399/363 |
| 2006/0284906 A1 * | 12/2006 | Jeong | B41J 2/15 347/5 |
| 2007/0003339 A1 * | 1/2007 | Edwards | G03G 15/23 399/364 |
| 2007/0196128 A1 * | 8/2007 | Ishihara | G03G 15/602 399/125 |
| 2007/0196132 A1 * | 8/2007 | Kobayashi | G03G 15/5008 399/167 |
| 2008/0239416 A1 * | 10/2008 | Kato | H04N 1/00909 358/498 |
| 2008/0266614 A1 * | 10/2008 | Doan | H04N 1/0057 358/474 |
| 2010/0045715 A1 * | 2/2010 | Takeuchi | B41J 2/16532 347/9 |
| 2011/0058847 A1 | 3/2011 | Furuichi et al. | |
| 2011/0142516 A1 * | 6/2011 | Uchida | B41J 3/4071 399/401 |
| 2011/0175282 A1 * | 7/2011 | Sagawa | B65H 1/04 271/258.01 |
| 2011/0261130 A1 * | 10/2011 | Hirai | B41J 29/17 347/104 |
| 2011/0305473 A1 * | 12/2011 | Tamaki | G03G 15/2053 399/67 |
| 2012/0161391 A1 * | 6/2012 | Kawamura | B65H 1/266 271/275 |
| 2015/0195419 A1 * | 7/2015 | Xu | H04N 1/00546 358/1.12 |
| 2016/0243861 A1 * | 8/2016 | Fukasawa | B41J 19/20 |
| 2018/0009613 A1 * | 1/2018 | Kawanishi | B65H 5/025 |
| 2018/0029373 A1 * | 2/2018 | Ishihara | B41J 2/1752 |
| 2018/0041657 A1 * | 2/2018 | Kohama | H04N 1/053 |
| 2018/0257414 A1 * | 9/2018 | Strom | B41J 2/175 |
| 2018/0281389 A1 * | 10/2018 | Arakane | B41J 2/16508 |
| 2018/0281478 A1 * | 10/2018 | Oguchi | B41J 13/0009 |
| 2018/0283500 A1 * | 10/2018 | Strom | B41J 29/13 |
| 2018/0304554 A1 * | 10/2018 | Strom | B29C 67/00 |
| 2019/0389680 A1 * | 12/2019 | Miyagawa | B65H 7/12 |

FOREIGN PATENT DOCUMENTS

| | | |
|---|---|---|
| JP | 2004-053667 A | 2/2004 |
| JP | 2006-302335 A | 11/2006 |
| JP | 2007251934 A | 9/2007 |
| JP | 2007-279274 A | 10/2007 |
| JP | 2009-288548 A | 12/2009 |
| JP | 2011-053630 A | 3/2011 |

* cited by examiner

FIG.4A   FIG.4B

PRINTING APPARATUS

BACKGROUND OF THE INVENTION

Field of the Invention

The present invention relates to a printing apparatus including a printer body unit and a scanner unit.

Description of the Related Art

A printing apparatus (multi-function machine) having a scanner unit that is openably/closably connected on the upper part of a printer body is known. The scanner unit reads an image and the printer body prints and image. In this printing apparatus, by opening the scanner unit, a user can perform an operation inside the printer body unit. Examples of such operations to be performed inside the printer body unit include detachment and replacement of ink tanks and print heads, and removal of a sheet upon the occurrence of jamming. After the operation, the user closes the scanner unit to bring the printing apparatus back to the state of normal use.

Japanese Patent Laid-Open No. 2007-0251934 discloses a configuration of alleviating an impact at the time of opening/closing a scanner unit using a damper mechanism including the mesh between a rack gear fixed to the scanner unit and a pinion gear provided in a printer body unit.

In an apparatus disclosed in Japanese Patent Laid-Open No. 2007-0251934, the rack gear as the damper mechanism is fixed in a manner of protruding downward from the scanner unit, and accordingly, a space for accommodating the rack gear inside the apparatus at the time of closing the scanner unit will be required. As a position of attaching the rack gear to the scanner unit departs from the rotation center of the opening and closing, a larger length of the rack gear is required and a larger space is thus required to accept the rack gear. In this regard, this causes limited designing flexibility in seeking for the downsizing of an apparatus, particularly for a thinner apparatus in its height direction. As such, there has been room for improvement on this matter.

SUMMARY OF THE INVENTION

An object of the present invention is, in a printing apparatus including an openable/closable scanner unit with respect to a printer body unit, to achieve smooth opening/closing movement and the downsizing of the apparatus at the same time.

The present invention provides a printing apparatus including: a printer body unit including a print head; a scanner unit which is openable and closable with respect to the printer body unit; a first gear member provided in the printer body unit; and a second gear member which is attached to the scanner unit and configured to mesh with the first gear member, wherein when the scanner unit opens or closes with respect to the printer body unit, the second gear member swings with respect to the scanner unit while retaining a meshing state with the first gear member.

According to the present invention, in the printing apparatus including the openable/closable scanner unit with respect to the printer body unit, the smooth opening/closing movement and the downsizing of the apparatus are achieved at the same time.

Further features of the present invention will become apparent from the following description of exemplary embodiments with reference to the attached drawings.

DESCRIPTION OF THE EMBODIMENTS

Embodiments of the present invention will be described below in detail with reference to the drawings. Incidentally, dimensions, materials, shapes, relative positions, and the like of the components described in the following embodiments are to be appropriately changed according to a configuration of an apparatus to which the present invention is applied and other various conditions thereof, and are not intended to limit the scope of the present invention.

The printing apparatus may be incorporated as part of a constituent element into a copying machine, a facsimile machine, or their multi-function machine, for example. In this case, scanned information read by a scanner unit is printed, by a printer body unit, as an image on a print medium such as a sheet. In other words, an image read by the scanner unit is copied by the printer body unit onto a sheet.

In the present embodiment, an inkjet printer will be described by way of example as a printing apparatus to which the present invention can be applied.

First Embodiment (Overall Configuration)

Figure 1:
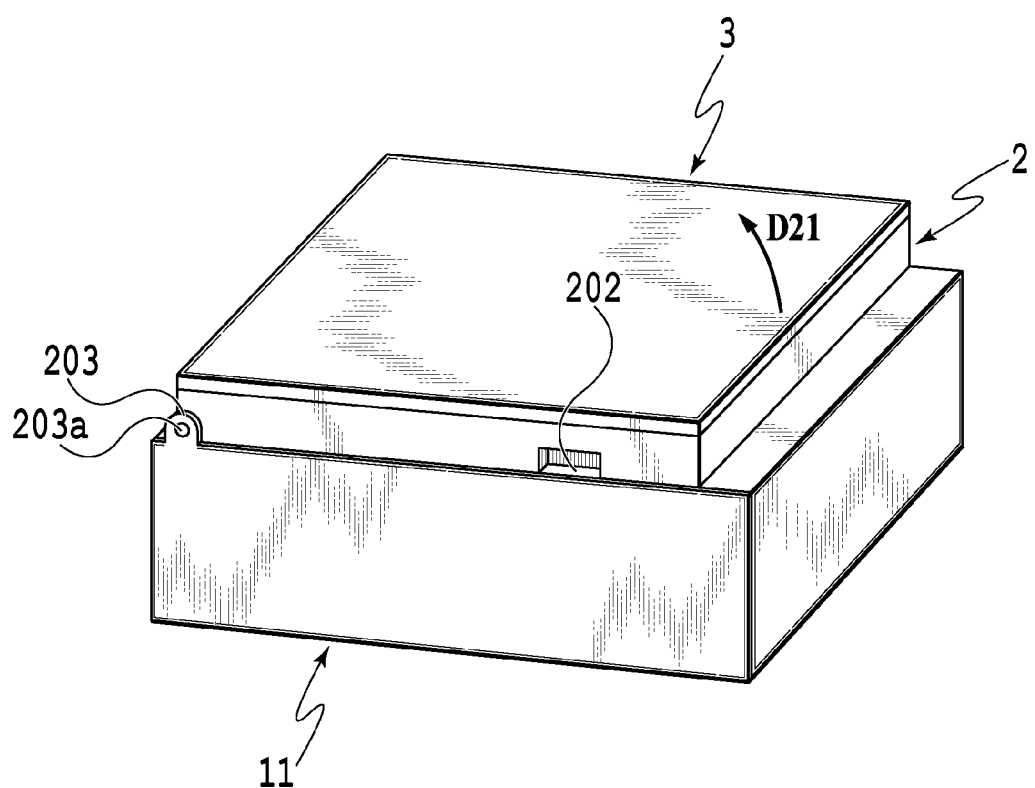
FIG. 1 is a perspective view of a printing apparatus according to a first embodiment.
Figure 2:
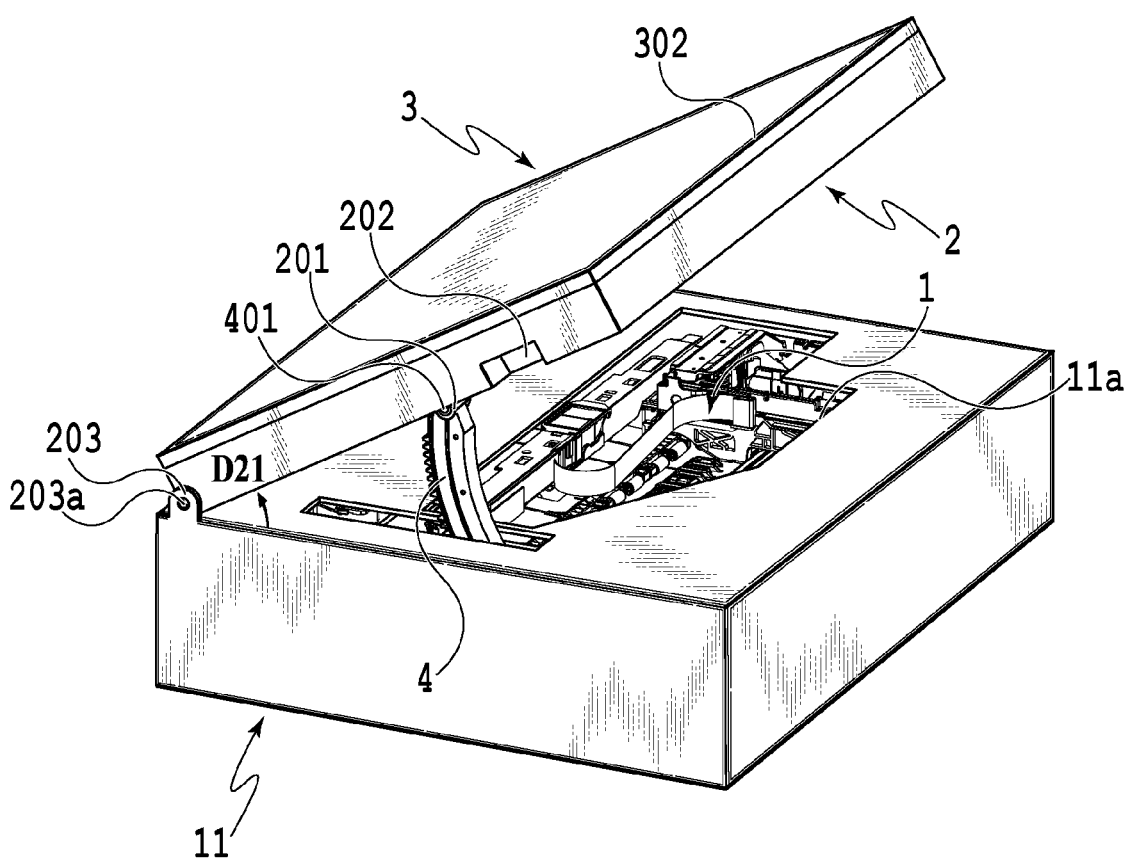
FIG. 2 is a perspective view showing a state in which a scanner unit of the printing apparatus of FIG. 1 is open.
Figure 3:
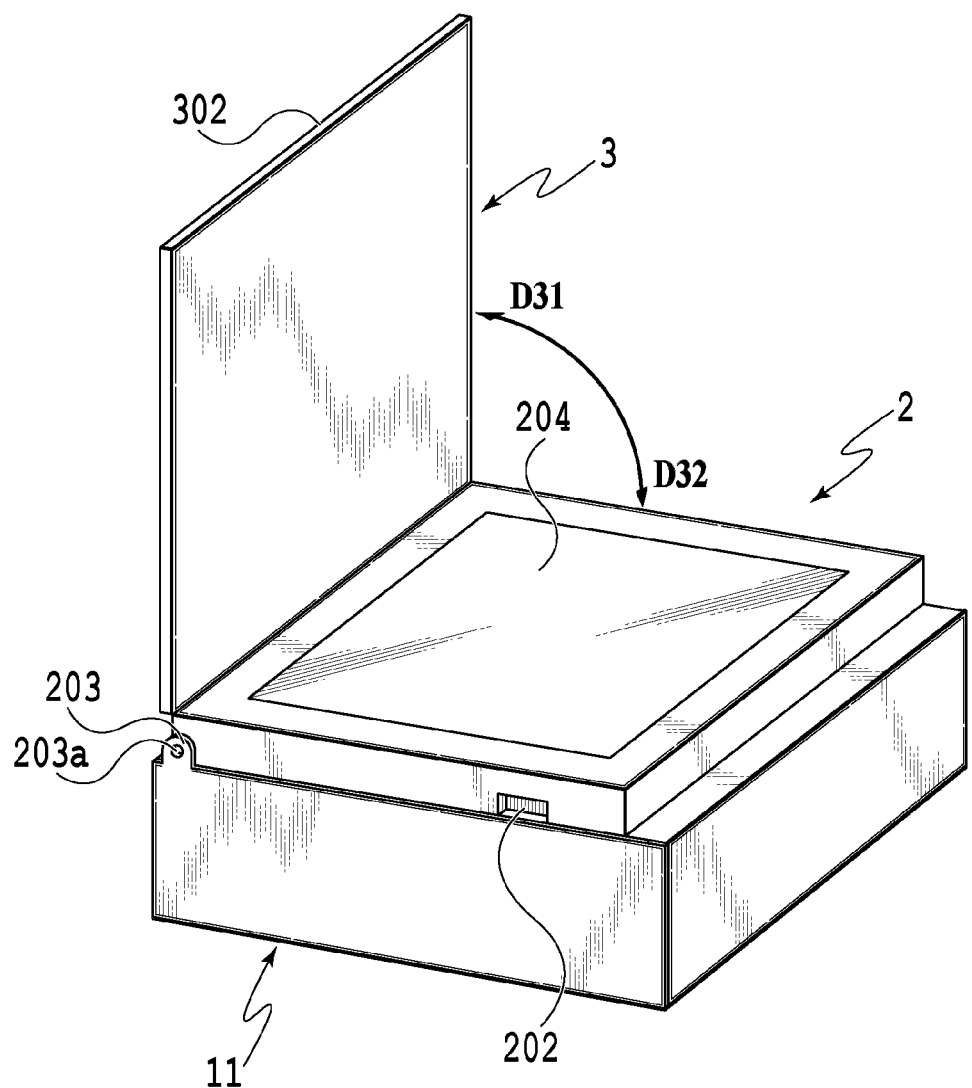
FIG. 3 is a perspective view showing a state in which a pressing plate unit of the printing apparatus of FIG. 1 is open.

First of all, an overall configuration of the printing apparatus according to the first embodiment will be described. FIG. 1 to FIG. 3 are perspective views of the printing apparatus in the first embodiment. At a lower side of the printing apparatus, a printer body unit 11 (printer unit) having a printer engine of an inkjet type provided inside a unit casing is arranged. The printer body unit 11 performs printing on sheets stacked in a non-illustrated sheet feeding cassette or on a non-illustrated sheet feeding tray which is disposed at the bottom by feeding them one by one to a non-illustrated print head of a printer unit 1, and discharges the resultant printed sheet to a non-illustrated sheet discharging tray.

On the printer body unit 11, a scanner unit 2 of a flat bed type which is rotatably openable with respect to the printer body unit 11 for maintenance is arranged. On the scanner unit 2, a document table glass 204 for placing a document and a pressing plate unit 3 are provided (see FIG. 3). It should be noted that the scanner unit 2 may be the one capable of performing automatic feed scanning by an automatic document feeder. The scanner unit 2 reads an image on the document placed on the document table glass 204 by a line sensor and sends the read image data to the printer body unit 11. The printer body unit 11 performs printing on a sheet based on the received image data. It should be noted that the printer body unit 11 may store the received image data in a non-illustrated external apparatus connected to the printing apparatus.

On the upper face of the printer body unit 11, an opening part 11a that leads to the printer unit 1 inside the printer body unit 11 is formed. This opening part 11a is formed so that an operator can perform operation including removing a sheet inside the printer body unit 11 in a case of defective sheet conveying (jamming) and replacing inks in a case of being out of ink.

The scanner unit 2 which is a reading unit disposed on the upper part of the printer body unit 11 is rotatably connected to the printer body unit 11 via a scanner hinge 203 provided on a back face side of the printing apparatus. As the scanner unit 2 rotates about a rotation center 203a of the scanner hinge 203 in a D21 direction, the front face side of the scanner unit 2 departs from the printer body unit 11 to form an open state as shown in FIG. 2. As a result, the opening part 11a of the printer body unit 11 is exposed so as to be accessible to the printer unit 1 inside the printer body unit 11 for maintenance. It should be noted that for forming the printer body unit 11 to be in the open state, the operator should put his/her hand on a handle part 202 formed on the scanner unit 2 and turn the scanner unit 2 in the D21 direction.

Once the operator releases his/her hand in the open state of the scanner unit 2, the rack gear 4 stretching between the scanner unit 2 and the printer body unit 11 is in a vertically standing state (see FIG. 5) and keeps the scanner unit 2 in the opening state. Incidentally, the rack gear 4 will be described later in detail in the explanation of the damper mechanism.

The pressing plate unit 3 is rotatably connected to the scanner unit 2 via a non-illustrated pressure plate hinge provided on the back face side of an image reader. The operator puts his/her hand on a handle part 302 formed on the pressing plate unit 3 and turns the pressing plate unit 3 in a D31 direction so that the front face side of the pressing plate unit 3 is in a state departed (open state) from the scanner unit 2 as shown in FIG. 3. By opening the pressing plate unit 3, a document can be placed on the document table glass 204 provided on the upper face of the scanner unit 2. After the document has been placed on the document table glass 204, the operator turns (closes) the pressing plate unit 3 in a D32 direction to cover the back face of the document, and operates the scanner unit 2 so as to read an image on the document.

(Basic Configuration of Damper Mechanism)

Figure 4:
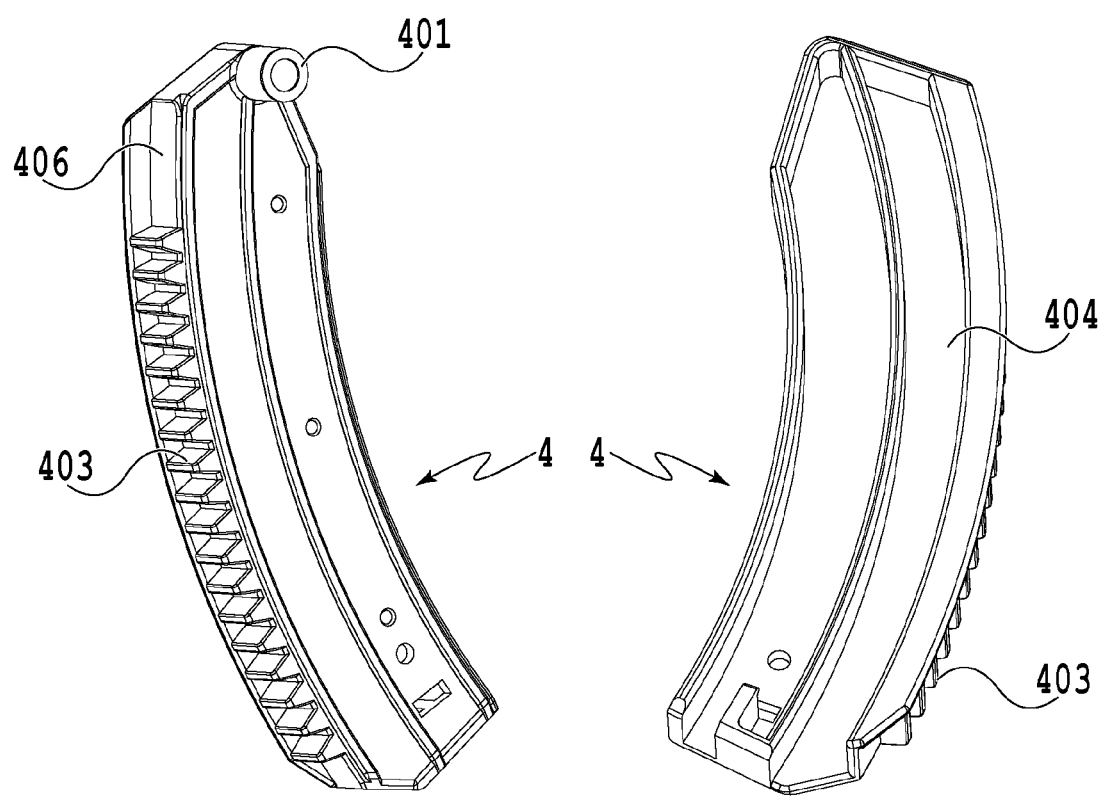
FIGS. 4A and 4B are perspective views showing a rack gear in a basic configuration of the first embodiment.
Figure 5:
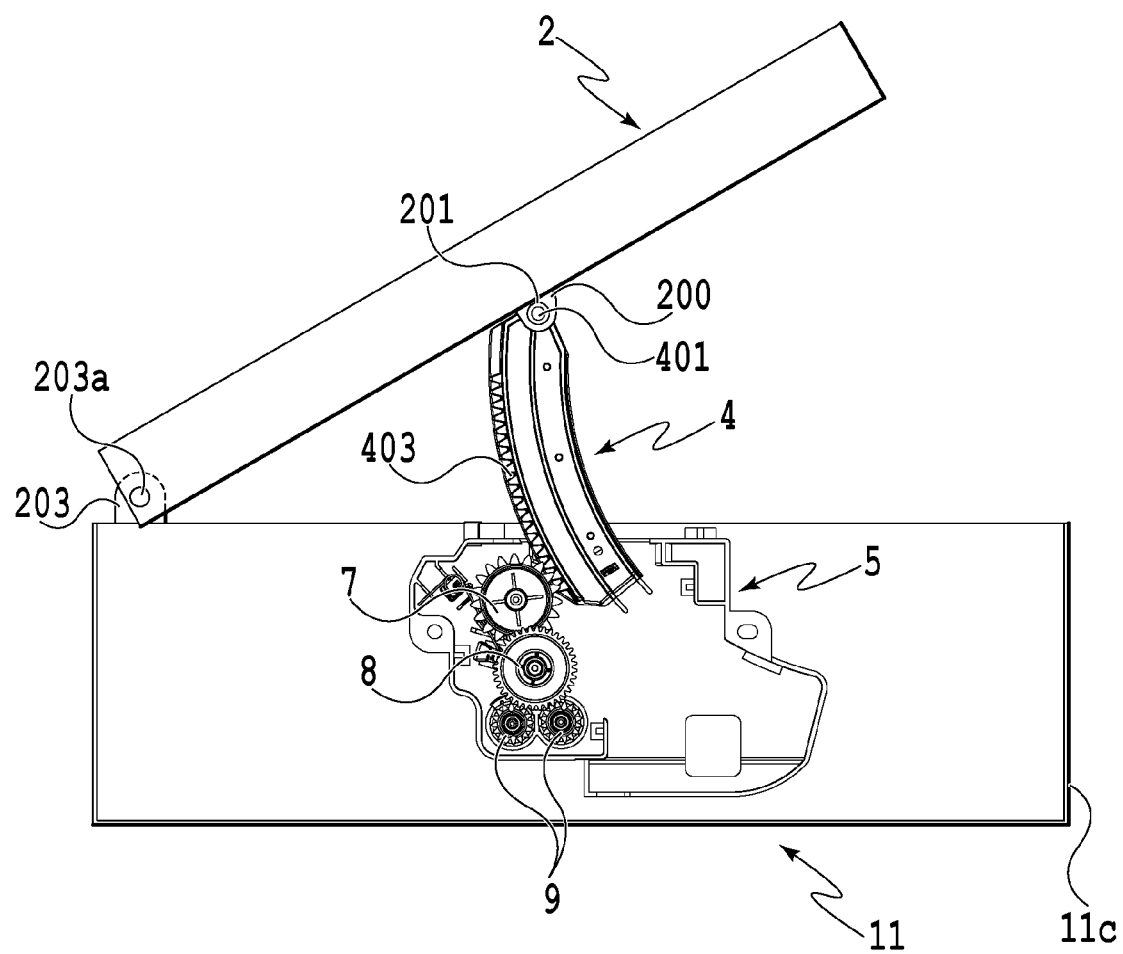
FIG. 5 is a side view showing a damper mechanism in the basic configuration of the first embodiment.

Next, with reference to FIG. 4A to FIG. 16, the basic configuration of the damper mechanism according to the first embodiment will be described. FIGS. 4A and 4B are perspective views showing a configuration of the rack gear 4 according to the first embodiment. Specifically, FIG. 4A shows a rack part 403 on which a plurality of teeth are formed, and FIG. 4B shows a back side of the rack part. FIG. 5 is a side view in which an internal configuration of the damper mechanism is visualized by removing some of external parts of the printing apparatus shown in FIG. 1.

As shown in FIG. 4A, on the upper end of the rack gear 4, a shaft (rocking fulcrum) 401 that engages the scanner unit is provided. Further, on the side face of the rack gear 4, the rack part 403 having gears formed thereon is formed. A pitch line of mesh for the rack part 403 is in an arc shape. In addition, a groove 404 is formed at the back side of the rack part 403 in a manner of sandwiching a gear teeth bottom part located therebetween.

As shown in FIG. 5, on the bottom face of the scanner unit 2, a bearing part 200 is provided. In the bearing part 200, a rotation hole 201 is formed. In the rotation hole 201, a shaft (rocking fulcrum) 401 formed at one end of the rack gear 4 is rotatably inserted and supported. In other words, the rack gear 4 is swingably connected to the scanner unit 2 with a center on the shaft 401. It should be noted that the shaft 401 inserted into the rotation hole 201 is parallel to the rotation center 203a of the scanner hinge 203.

Figure 6:
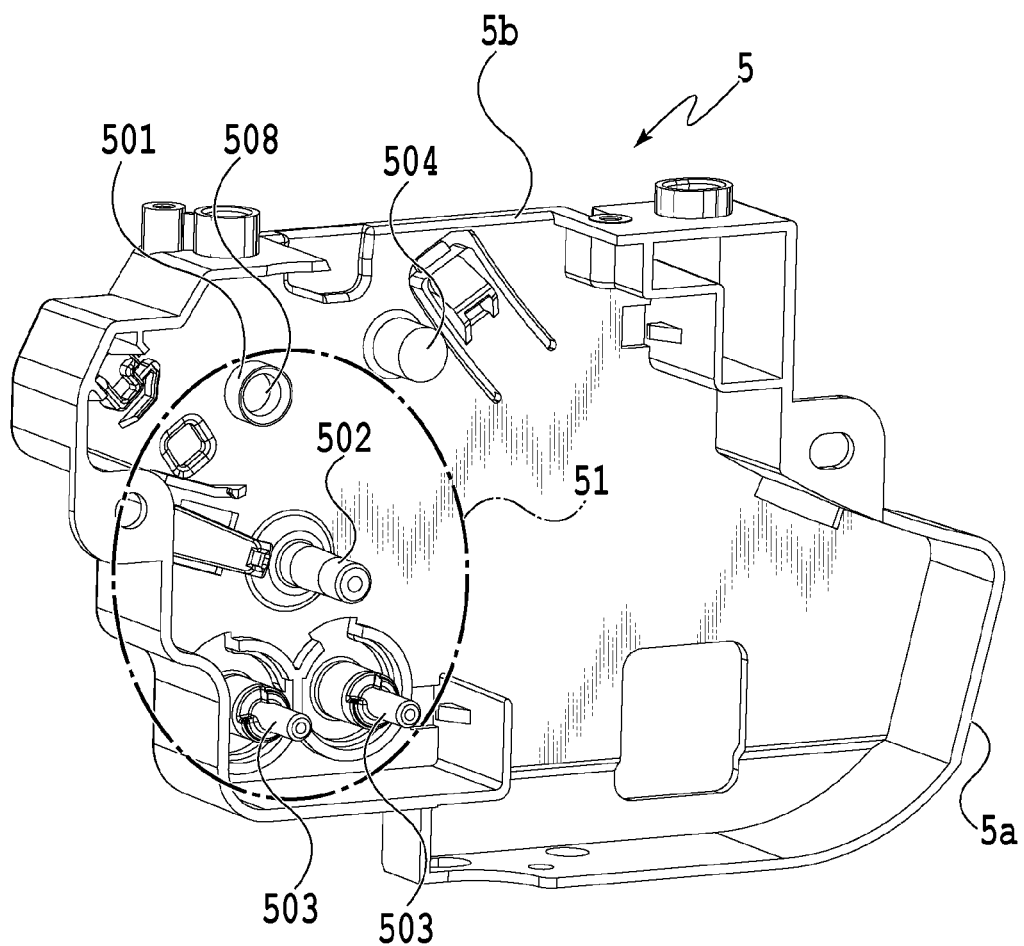
FIG. 6 is a perspective view showing a gear base of the first embodiment.

In the inner side part of a casing member 11C forming an outer shell of the printer body unit 11, a gear base 5 is fastened and fixed with a screw. FIG. 6 shows an internal structure of the gear base 5. As illustrated, the gear base 5 includes a plate-like side wall and a peripheral wall 5a integrally formed along the end part of the side wall. On the upper part of the peripheral wall 5a, an opening 5b for inserting the rack gear is formed. In the inner side face of the gear base 5, a gear shaft holding shape group 51 including a hole 508 for supporting the gear and shafts 501, 502, and 503 is integrally formed.

Figure 7:
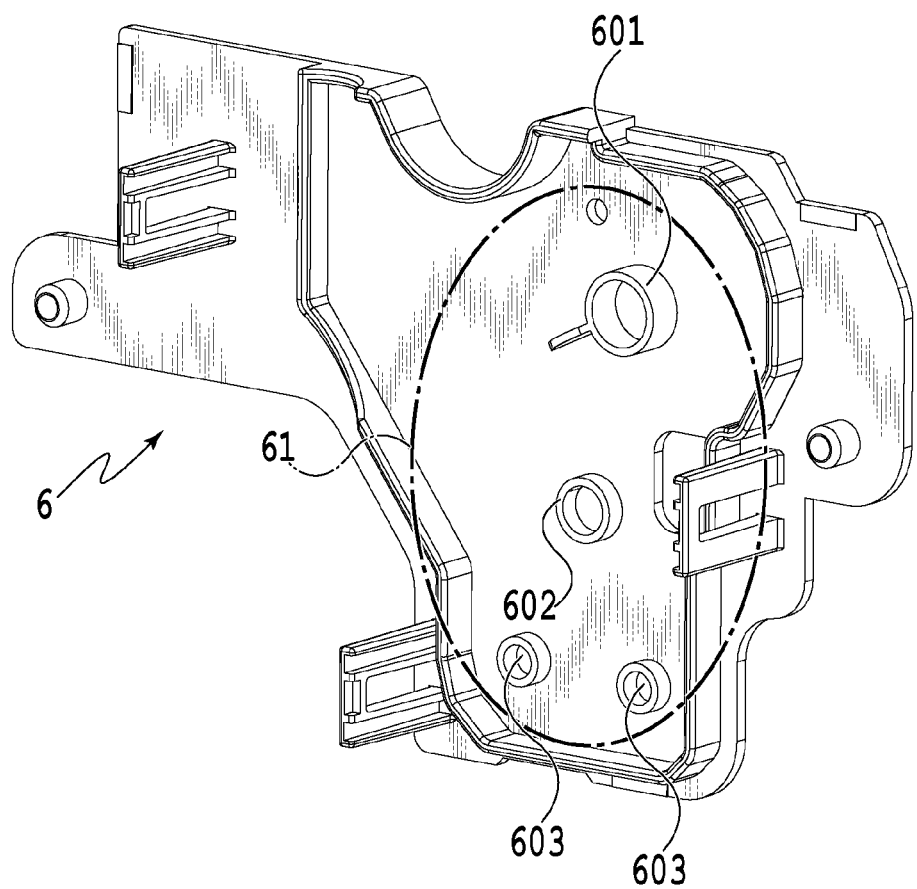
FIG. 7 is a perspective view showing a gear cover of the first embodiment.

FIG. 7 is a view showing a gear cover 6 to be fixed to the above-described gear base 5. The gear cover 6 is formed in a plate shape having a size substantially identical to the size of the gear base 5. In the inner side face of the gear cover 6, as in the gear base 5, a gear shaft holding shape group 61 is integrally formed. The gear base 5 and the gear cover 6 are combined together such that the gear shaft holding shape group 51 and the gear shaft holding shape group 61 respectively formed therein face each other. By providing the gear base 5 and the gear cover 6, a gear accommodating part 56 for accommodating the gear group to be described later is formed.

Figure 8:
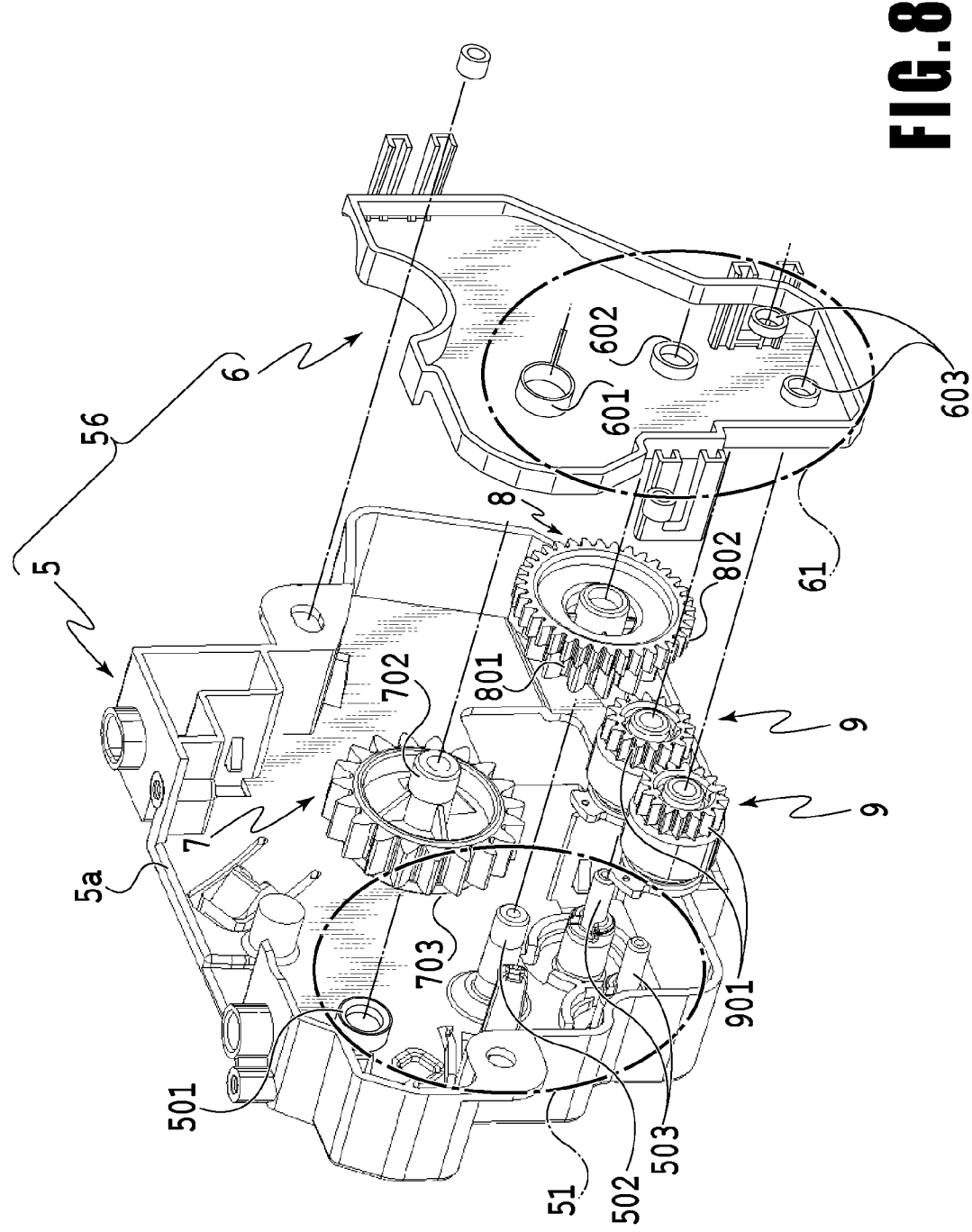
FIG. 8 is an exploded perspective view showing a gear group of the first embodiment.

FIG. 8 is an exploded perspective view showing the gear accommodating part 56 and the gear group accommodated therein. Inside the gear accommodating part 56, a pinion gear 7, an idler gear 8, and a clutch gear 9 which are to be described later are accommodated. The gear cover 6 is fixed to the gear base 5 so that the gear shaft holding shape group 61 and the gear shaft holding shape group 51 of the gear base 5 face each other. As for fixing the gear cover 6 to the gear base 5, a snap fitting, locking by a hook having rigidity, or screw tightening, for example, can be used.

Each of the gears in the gear group accommodated in the gear accommodating part 56 will be described.

Figure 9A:
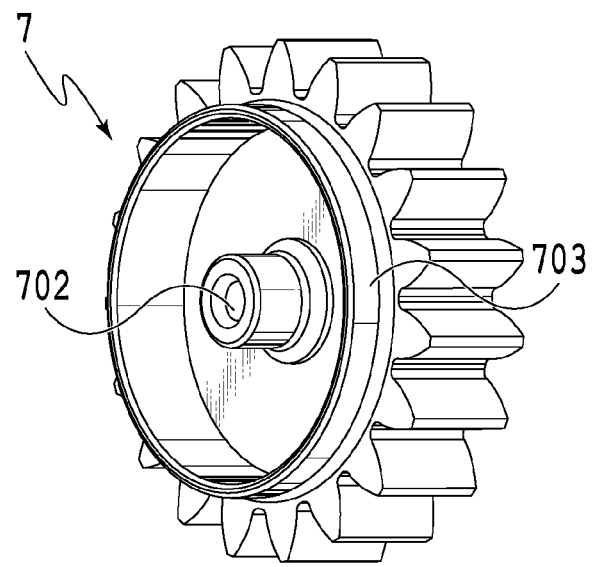
FIGS. 9A and 9B are perspective views showing a pinion gear of the first embodiment.
Figure 9B:
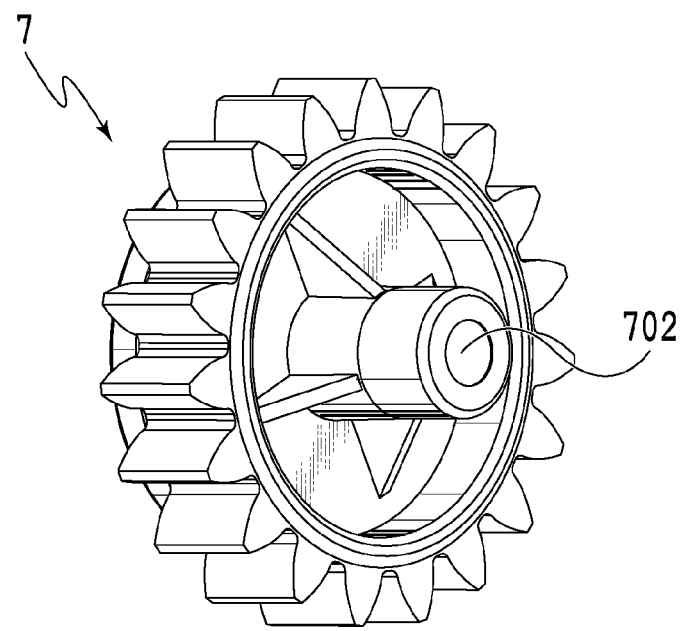

FIGS. 9A and 9B are views showing the both side faces of the pinion gear 7. The pinion gear 7 is a circular gear, and at its center, a cylindrical shaft 702 extending in a rotating axis direction is formed on both side faces of the gear. Further, on one side face of the gear, an annular rib 703 is formed so as to protrude outside the teeth width of the gear in the rotating axis direction. A position of the rotation shaft of the pinion gear 7 is fixed inside the printer body unit 11.

As shown in FIG. 8, a pinion holding shape part 501 which is one of the gear shaft holding shape group 51 formed on the gear base 5 and a pinion holding shape part 601 which is one of the gear shaft holding shape group 61 formed on the gear cover 6 are each formed with a rib projected in a cylindrical shape. One end of the shaft 702 of the pinion gear 7 is rotatably inserted into the pinion holding shape part (shaft) 501 and the other end is rotatably inserted into the pinion holding shape part 601, having its position restricted in a radial direction. In addition, the annular rib 703 faces a part of a plate-like inner side face of the gear base 5 and is positively set to have a positional relation in which the annular rib slides, with friction, over the inner side face of the gear base 5 in a case where the pinion gear 7 is tilted. Accordingly, the tilt of the pinion gear 7 can be restricted. As such, the pinion gear 7 is rotatably supported with a center on an axis of the shaft 702 formed on the gear base 5 and the gear cover 6.

Figure 10A:
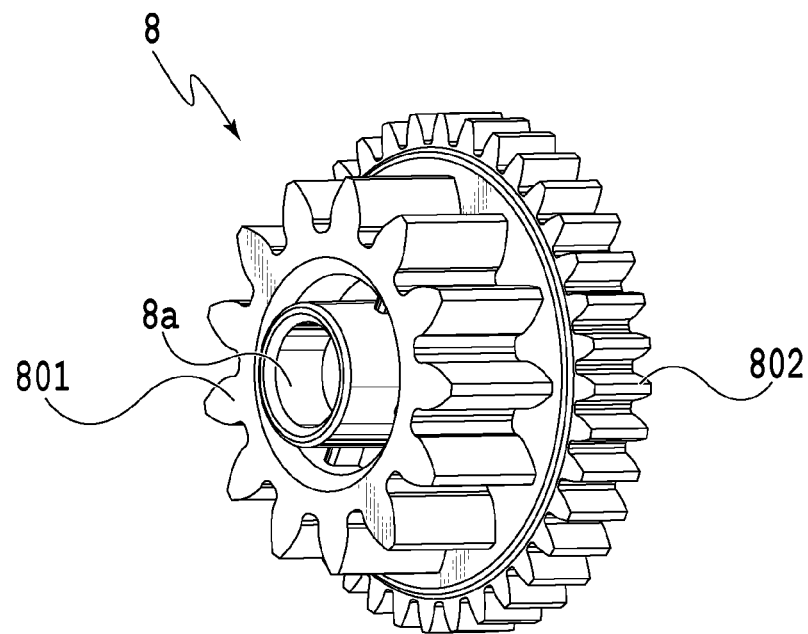
FIGS. 10A and 10B are perspective views showing an idler gear of the first embodiment.
Figure 10B:
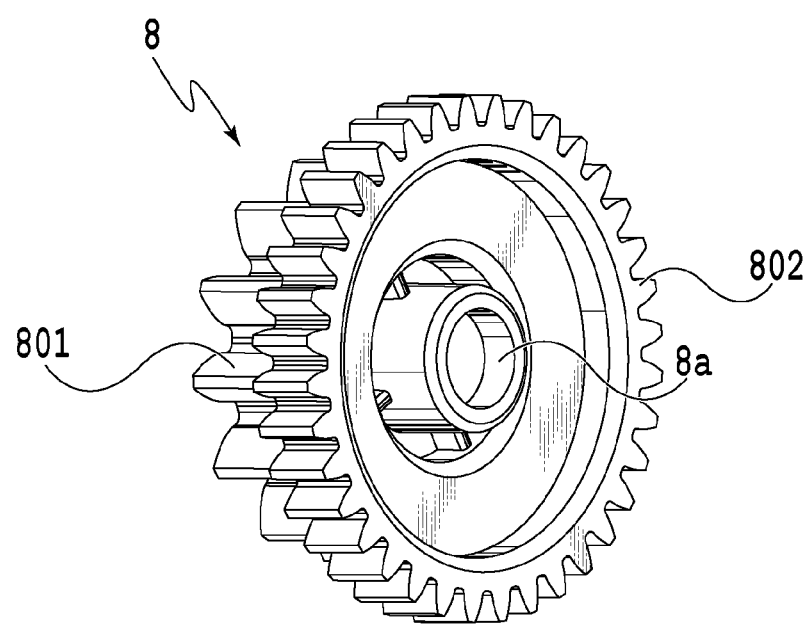

FIGS. 10A and 10B are perspective views showing both side faces of the idler gear 8. The idler gear 8 is formed in a step-gear manner such that two gear parts are integrally combined on the same axis. Among the two gear parts, a first gear part 801 is set to have a module of 1.5, and a second gear part 802 is set to have a module of 0.8.

As shown in FIG. 8, an idler holding shape part 502 which is one of the gear shaft holding shape group 51 formed on the gear base 5 is formed in a shaft shape. An idler holding shape part 602 which is one of the gear shaft holding shape group 61 formed on the gear base 5 is formed in a hollow cylindrical shape. Mutual fitting of the idler holding shape part 502 and the idler holding shape part 602 brings their centers to be identical. The idler holding shape part 502 is rotatably inserted into the central hole of the idler gear 8 so that the idler gear 8 is rotatably supported.

Figure 11:
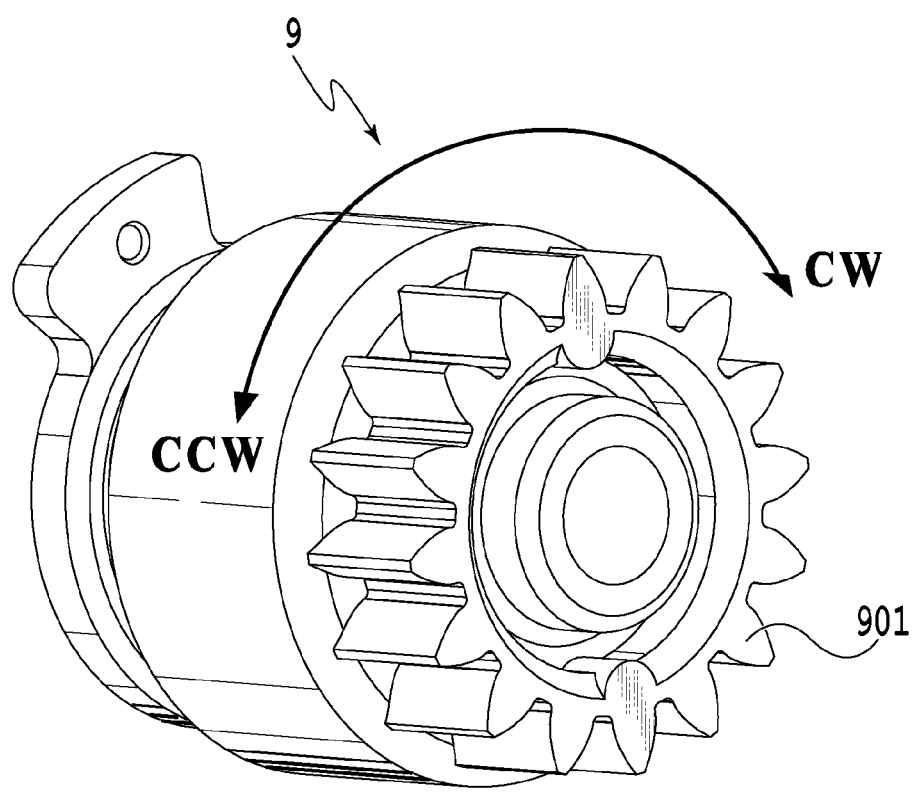
FIG. 11 is a perspective view of a clutch gear unit of the first embodiment.

FIG. 11 is a perspective view showing a clutch gear unit 9. In the present embodiment, as shown in FIG. 8, two clutch gear units 9 are provided. The two clutch gear units 9 are rotatably supported by clutch holding shape parts 503 and 603 included in the gear shaft holding shape groups 51 and 61, respectively. Further, each of the clutch gear units 9 is composed of a plurality of parts. Specifically, the clutch gear unit 9 at least includes a clutch gear 901 that is in mesh with the second gear part 802 of the idler gear 8 and a clutch mechanism (not shown) that restricts rotation of the clutch gear 901. The clutch mechanism allows a clockwise (hereinafter referred to as CW) rotation of the clutch gear 901 while applying braking. In addition, the clutch mechanism allows a counterclockwise (hereinafter referred to as CCW) rotation without applying braking at all so as to cause the clutch gear 901 to rotate idly.

Figure 12:
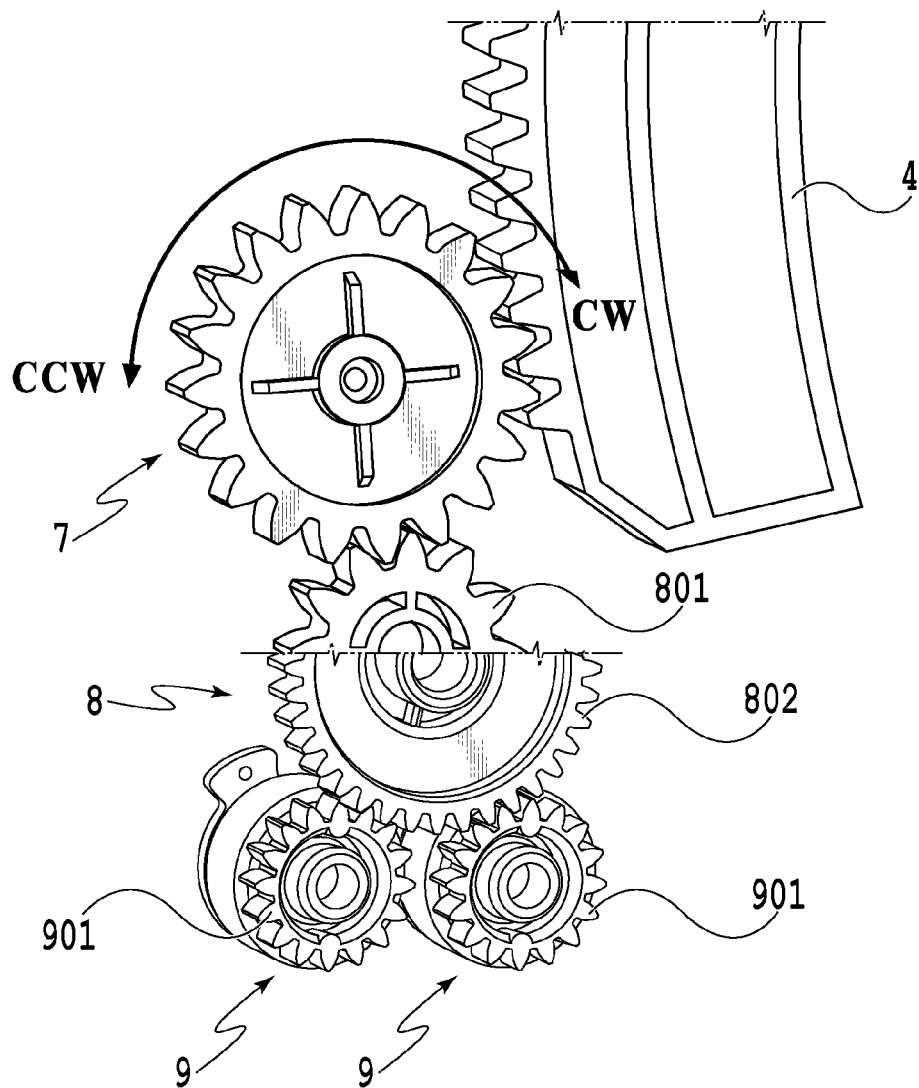
FIG. 12 is a perspective view showing mesh of the gear group in the damper mechanism of FIG. 5.

Next, with reference to FIG. 12 to FIG. 16, linkage relations between each of components constituting the damper mechanism of the scanner unit 2 will be described. The damper mechanism is, as shown in FIG. 12, composed of the rack gear 4 (second gear member), the pinion gear 7 (first gear member), the idler gear 8, and the clutch gear units 9. In FIG. 12, only part of first and second gear parts 801 and 802 are shown for the idler gear 8.

The pinion gear 7 is in mesh with the rack gear 4, and at the same time, is in mesh with the first gear part 801 of the idler gear 8. The second gear part 802 of the idler gear 8 is in mesh with the two clutch gears 901 of the clutch gear units 9 located at two locations on the circumference of the second gear part. As such, a state from the pinion gear 7 to the clutch gear units 9 is in direct connection, and a force of the clutch gear units 9 is constantly conveyed to the pinion gear 7. Specifically, a braking force from the two clutch gear units 9 is configured to be applied to the CW rotation of the pinion gear 7, whereas such a braking force is configured not to be applied to the CCW rotation so that the pinion gear 7 rotates idly.

Figure 13A:
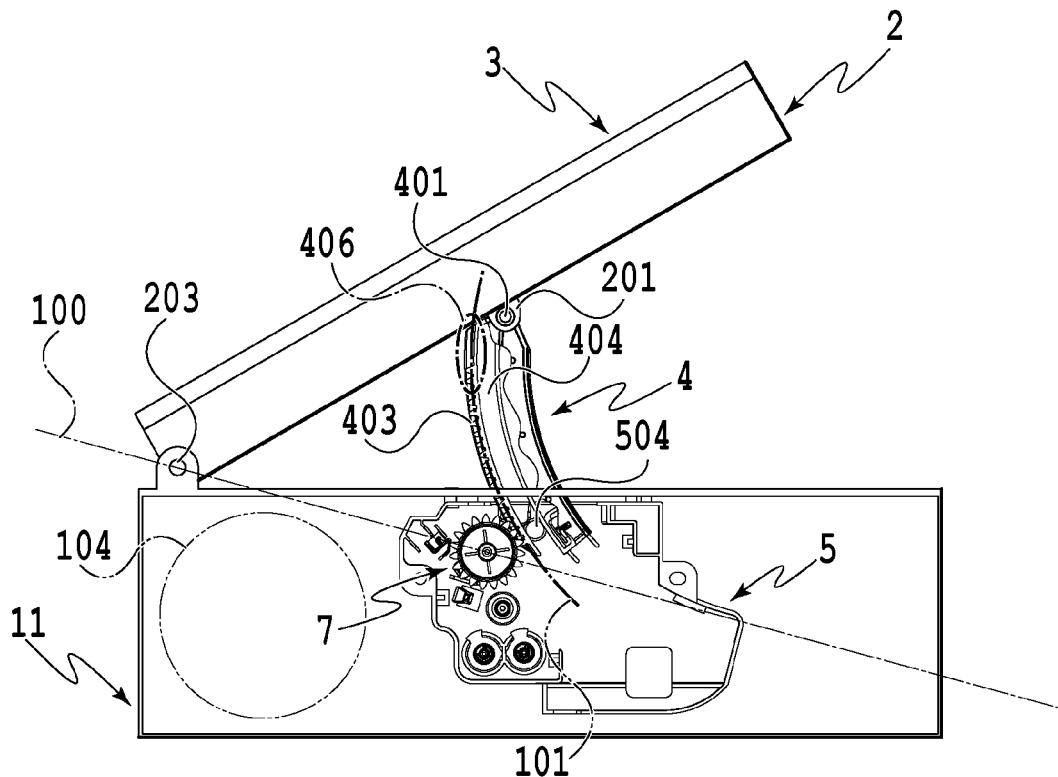
FIGS. 13A and 13B are side views showing movement in the basic configuration of the first embodiment.
Figure 13B:
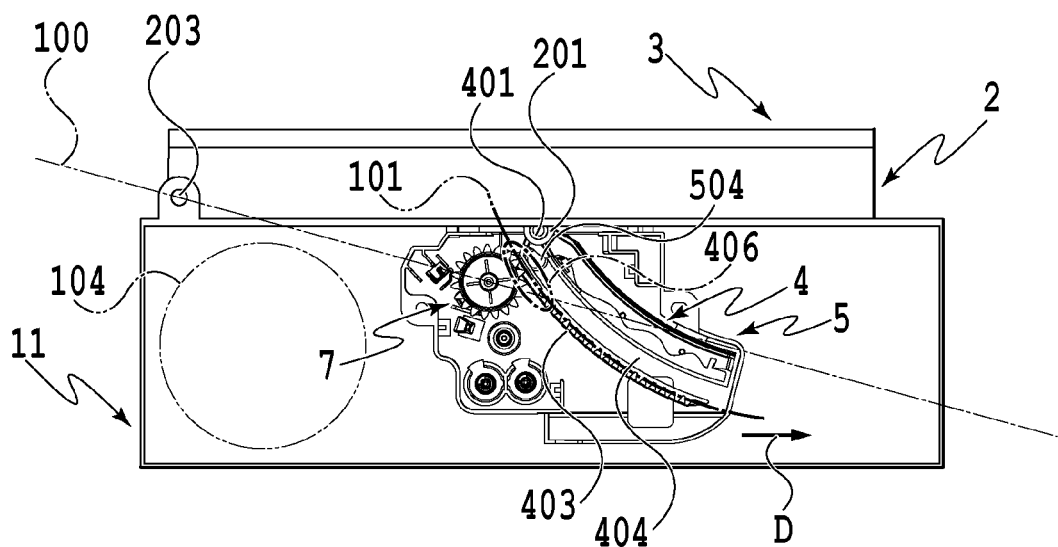

FIGS. 13A and 13B are views showing movement of the printer body unit 11, the scanner unit 2, the pinion gear 7, the rack gear 4, and a sliding shaft 504 serving as the damper mechanism according to the present embodiment. FIG. 13A shows a state of an open position in which the scanner unit 2 is turned to a predetermined angle from the upper face of the printer body unit 11, and FIG. 13B shows a state of a closed position in which the scanner unit 2 covers the upper face of the printer body unit 11.

At the back side of the rack part 403 (teeth part) of the rack gear 4, a groove 404, which is a guide face, is formed. To the groove 404, an end of the sliding shaft 504, which is a guide part, protrudingly provided on the inner side face of the gear base 5 is movably engaged. Therefore, while the shaft 401 provided on the upper end of the rack gear 4 is rotatably supported by the rotation hole 201 of the bearing part 200 of the scanner unit 2, the rack gear 4 is movably supported by the sliding shaft 504 within a range of formation of the groove 404. Accordingly, the rack gear 4 retains a constant state of engagement with the sliding shaft 504 formed on the printer body unit 11 side regardless of the open/closed position of the scanner unit 2.

Further, a dot and dash line 100 shown in FIGS. 13A and 13B is a virtual straight line connecting the rotation center 203a of the scanner unit 2 and the rotation center of the pinion gear 7 and is constantly depicted at a given position. A long dashed double-short dashed line 101 is a pitch line of the rack part 403 formed on the rack gear 4, and moves along the rack gear 4. The pitch line 101 forms a convex arc shape, and is convexly curved with respect to the rotation center of the pinion gear 7. In other words, the rack gear 4 includes a rack part of a convexly curved arc shape, and the teeth of the rack part are in mesh with the teeth of the pinion gear 7.

Figure 14:
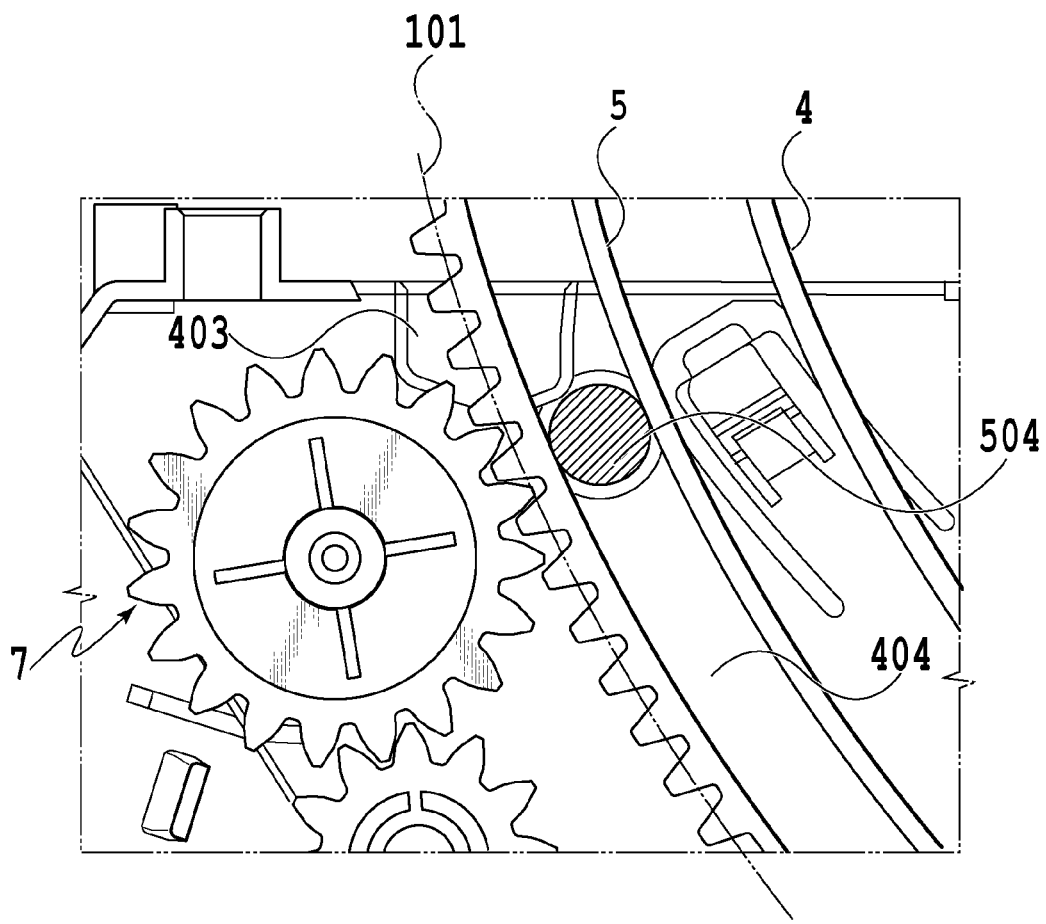
FIG. 14 is a side view showing a guide mechanism in the basic configuration of the first embodiment.

FIG. 14 is an enlarged view showing the pinion gear 7, the rack gear 4, and the sliding shaft 504 according to the present embodiment. To the groove 404 formed on the back side of the wall at the teeth bottom of the rack gear 4, the sliding shaft 504 protrudingly provided on the gear base 5 is movably engaged. The sliding shaft 504 and the groove 404 allow the configuration of the guide mechanism which guarantees the mesh between the pinion gear 7 and the rack gear 4.

Next, with reference to FIGS. 15A, 15B, and 15C, the movement of the damper mechanism at the time of opening the scanner unit 2 will be described. FIG. 15A shows a closed state of the scanner unit 2. The rack gear 4 is supported by the rotation hole 201 of the bearing part 200 of the scanner unit 2 and the sliding shaft 504 of the gear base 5. In the illustrated state, a portion (non-mesh portion) 406 other than a range in which the rack part 403 is formed in the rack gear 4 faces the pinion gear 7. Accordingly, in the state shown in FIG. 15A, the rack part 403 and the pinion gear 7 are not in mesh.

Once the operator turns the scanner unit 2 in an opening direction from the state shown in FIG. 15A, the scanner unit 2 turns in the D21 direction around the rotation center of the scanner hinge 203. Along with this, the shaft 401 of the rack gear 4 supported by the bearing part 200 of the scanner unit 2 also moves in the D21 direction. As a result, the rack gear 4 moves in a D1 direction while having the groove 404 guided by the sliding shaft 504 (see FIG. 15B). Due to this movement, the rack part 403 approaches the teeth part of the pinion gear 7 while keeping a distance of mesh with the pinion gear 7, and at the time of passing through the end of the non-mesh part 406, the rack part 403 becomes in mesh with the pinion gear 7.

As a result of the mesh between the rack part 403 of the rack gear 4 and the pinion gear 7, the pinion gear 7 to which a motive power is conveyed from the rack gear 4 starts rotation in a CCW direction. As described above, at the time of rotation of the pinion gear 7 in the CCW direction, the clutch gear 901 rotates with no braking being applied and thus the pinion gear 7 also rotates (idly rotates) in a low load. Accordingly, the operator can move the scanner unit 2 in the open direction with a light force. The rack gear 4 moves on while retaining the meshing state with the pinion gear 7 until the scanner unit 2 abuts on a non-illustrated stopper to stop its rotation.

Figure 15C:
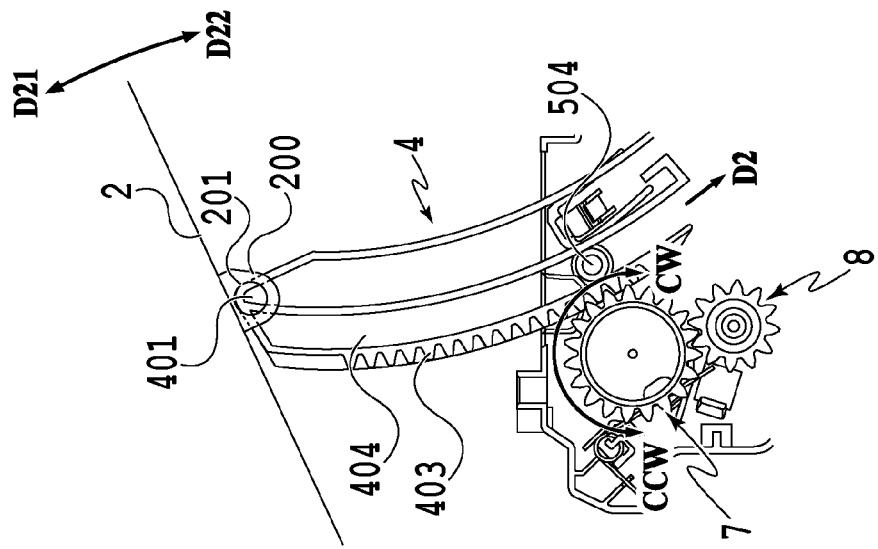
FIGS. 15A to 15C are side views showing movement of the rack gear and the pinion gear of the first embodiment.
Figure 15B:
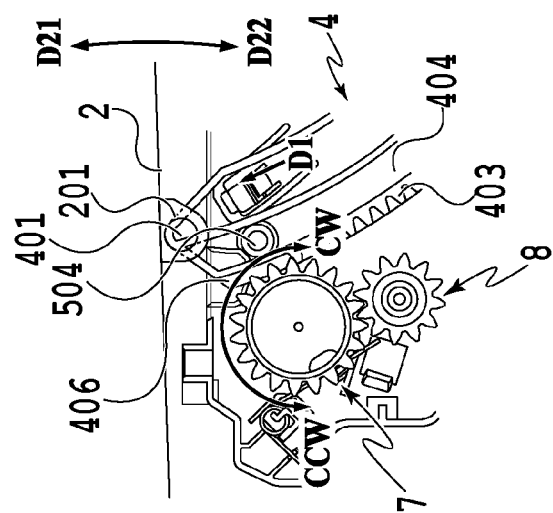
Figure 15A:
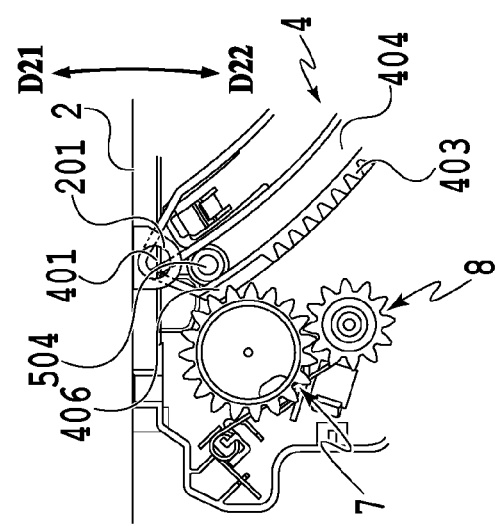

Once the scanner unit 2 reaches a predetermined open position and abuts on the non-illustrated stopper to stop rotation, a movement of the rack gear 4 and a rotation of the pinion gear 7 also stop so as to become in a state shown in FIG. 15C. In the present embodiment, due to the following configuration, the scanner unit 2 can be held in the open position even if the operator releases his/her hold from the scanner unit 2.

Once the scanner unit 2 abuts on the non-illustrated stopper, the scanner unit 2 no longer opens, and the operator acknowledges that the scanner unit 2 is fully open, then stops operation for opening, and releases his/her hold from the handle part 202. The scanner unit 2 that has lost a support by the operator is pulled by gravity so as to be urged in a closing direction. As the scanner unit 2 is urged in the gravity direction, an urging force is also generated on the rack gear 4 toward a D2 direction shown in FIG. 15C. Then, an urging force of rotation in a CW direction is added to the pinion gear 7 which is in mesh with the rack gear 4.

As described above, the pinion gear 7 is configured to allow rotation in the CW direction with braking being applied. Therefore, braking is applied to the rotations of the idler gear 8 and pinion gear 7 and the movement of the rack gear 4, and the braking force is set to be larger than the rotation force of the pinion gear 7 in the CW direction caused by the gravity of the scanner unit 2. As a result, the rotation and movement of each of the gears stop and the scanner unit 2 is held at that position.

Next, the movement of each part in the case of moving the scanner unit 2 from the open position of FIG. 15C to the closed position of FIG. 15A will be described. As shown in FIG. 15C, if the operator applies a force to the scanner unit 2 in a closing direction from the state in which the scanner unit 2 is in the open position, a combined force of gravity and an operator's operating force is applied to the scanner unit 2. At the point of time in which this combined force becomes larger than the braking force of the clutch gear, the scanner unit 2 starts rotation around the rotation center 203a of the scanner hinge 203 in the closing direction.

For allowing the operator to close the scanner unit 2 without applying a large operating force, a braking force of the non-illustrated clutch gear 9 is set, considering variations and the like in manufacturing, to be slightly larger than the rotation force in the CW direction caused by the gravity of the scanner unit 2. Once the operator performs pressing operation to cause the scanner unit 2 to start rotation in the closing direction, the rack gear 4 moves in the D2 direction while the groove 404 is guided by the sliding shaft 504. In this movement, since the braking force from the clutch gear 9 is transmitted to the rack gear 4, the operator is to press down the scanner unit 2 against this braking force.

Due to the operator's operation, the scanner unit 2 rotates in the closing direction. Along with this, the rack gear 4 moves on and the scanner unit 2 approaches the closed position. Then, as shown in FIG. 15B, the rack part 403 departs from a portion facing the pinion gear 7, and finally, as shown in FIG. 15A, the non-mesh portion 406 in which the gear is not formed faces the pinion gear 7, and the mesh between the rack gear 4 and the pinion gear 7 is released. As such, immediately before the scanner unit 2 abuts on the non-illustrated stopper to be held at the closed position, the holding and braking served by the damper mechanism is resolved. At the closed position, the scanner unit 2 is securely held by a stopper instead of by the damper mechanism.

As for the configuration of not applying braking to the pinion gear 7 in the case of opening the scanner unit 2 and applying braking to the pinion gear 7 in the case of closing the scanner unit 2, it is also possible to apply a configuration other than the clutch gear 9. For instance, as disclosed in Japanese Patent Laid-Open No. 2007-0251934, gear connections from the pinion gear to a component configured to apply braking may be switched in accordance with the opening/closing of the scanner unit 2. In this case, since the braking force is not transmitted at the time of opening, there is no need to adopt a configuration in which the braking force is not generated at the time of rotation in a certain direction, as in the clutch gear 9. In other words, the present invention may have a configuration in which the braking force is constantly generated regardless of rotating directions. Alternatively, it is also possible to apply a configuration in which the braking force is generated at the time of rotation in the closed position so as not to be rotated in a rotating direction that is opposite to the rotating direction at the time of closing operation. As such, the configuration of applying the braking force to the pinion gear 7 is not particularly limited, and any configuration is applicable as long as the braking force can be applied directly or indirectly to the pinion gear.

Next, with reference to FIGS. 13A, 13B, FIG. 14, and FIG. 16, the movement of mesh portion of the rack gear 4 and the pinion gear 7 in a series of operation in the above damper mechanism will be described in detail. The rack gear 4 in the damper mechanism has the shaft 401 provided at one end of the rack gear as shown in FIGS. 13A and 13B, and the shaft 401 is rotatably inserted into the rotation hole 201 of the scanner unit 2 and is supported thereby. Further, to the groove 404 of the rack gear 4, the sliding shaft 504 within the gear base 5 fixed to the printer body unit 11 is slidably fitted. Therefore, the rack gear 4 is rotatable with respect to the scanner unit 2 and is slidable with respect to the printer body unit 11.

The scanner unit 2 rotates about a rotation center 203 which is in a positional relation independent from the sliding shaft 504. Along with the rotation of the scanner unit 2, the rack gear 4 moves by depicting a particular track instead of a simple linear motion or circular motion. In this case, as a result of the rotation of the scanner unit 2, a position of the mesh between the rack part 403 of the rack gear 4 and the pinion gear 7 is changed. Then, the shaft 401 of the rack gear 4 rotates within the rotation hole 201 provided in the bearing part 200 of the scanner unit 2, thereby changing the relative position between the rack gear 4 and the scanner unit 2.

Figure 16:
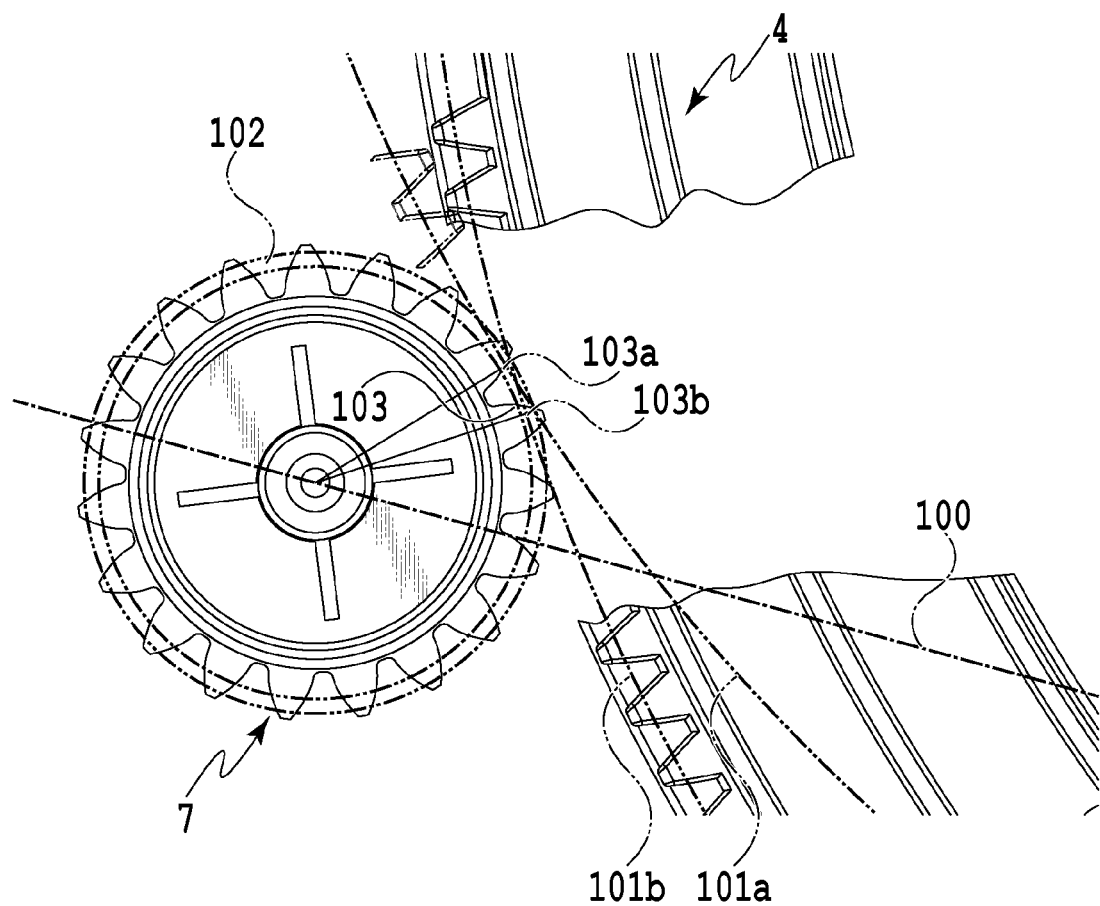
FIG. 16 is a side view showing a guaranteed range of the mesh of gears in the first embodiment.

FIG. 16 is an enlarged view showing the mesh portion of the pinion gear 7 and the rack gear 4 in FIGS. 13A and 13B, omitting part of the rack gear 4. An annular shaped range 102 shown in FIG. 16 is a range formed outwardly from a pitch circle of the pinion gear 7, which is an guaranteed range of the gear mesh including backlash and tolerance between the pinion gear 7 and the rack gear 4. In other words, if a pitch point of the pinion gear 7 and rack gear 4 is within this guaranteed range of the mesh, the rack gear 4 and the pinion gear 7 are reliably in mesh, serving as gears, so as to mutually convey motive power.

Furthermore, the dot and dash line 100 shown in FIG. 16 is a straight line connecting the rotation center 203 of the scanner unit 2 and the rotation center of the pinion gear 7 as in FIGS. 13A and 13B, and the long dashed double-short dashed lines 101a and 101b are pitch lines for the rack gear 4.

As described above with reference to FIG. 14, the rack part 403 of the rack gear 4 is guaranteed to be in mesh with the pinion gear 7 due to the guidance by the sliding shaft 504. Accordingly, at the time of opening/closing the scanner unit 2, the rack gear 4 moves between the position shown in FIG. 13A and the position shown in FIG. 13B. At this time, in FIG. 16, along with the movement of the rack gear 4, a central point (pitch point 103) of the mesh between the rack gear 4 and the pinion gear 7 moves between positions denoted as 103a and 103b.

A pitch line of the rack part 403 of the rack gear 4 in a case where the pitch point is at a position indicated as 103a is denoted as 101a, and a pitch line of the rack part 403 of the rack gear 4 in a case where the pitch point is at a position indicated as 103b is denoted as 101b. More specifically, as a result of opening/closing movement of the scanner unit 2, the pitch line moves between 101a and 101b and the pitch point moves between 103a and 103b. The pitch point is constantly at a position apart from the above-described dot and dash line 100 connecting the rotation center 203a of the scanner unit 2 and the rotation center of the pinion gear 7.

The pitch point 103 of the rack gear 4 and pinion gear 7 according to the present embodiment is not a fixed pitch point located on the straight line connecting the rotation center of the scanner unit and the rotation center of the pinion gear as in a conventional technique, but is a variable pitch point depending on a position of the rack gear 4. This pitch point 103 moves in a circumferential direction around the pinion gear 7 within the range 102 shown in FIG. 16, and does not pass over the dot and dash line 100 shown in FIG. 16. It should be noted that the pitch point should preferably move within a range by about 0.5 of a tooth or more on the basis of the pinion gear 7. In the present example, the pitch point moves within a range by 0.7 of the tooth.

In addition, according to this configuration, as shown in FIGS. 13A and 13B, the movement of the rack gear 4 is not a simple circular motion but a track of the rack gear movement can be set by setting a position of the sliding shaft 504 and a shape of the groove 404. In other words, in a case where the scanner unit 2 is moved from the open position shown in FIG. 13A to the closed position shown in FIG. 13B, the rack gear 4 can be rotated around the rotation hole 201 in a direction (direction of arrow D) different from the moving direction of the scanner unit 2.

Figure 22A:
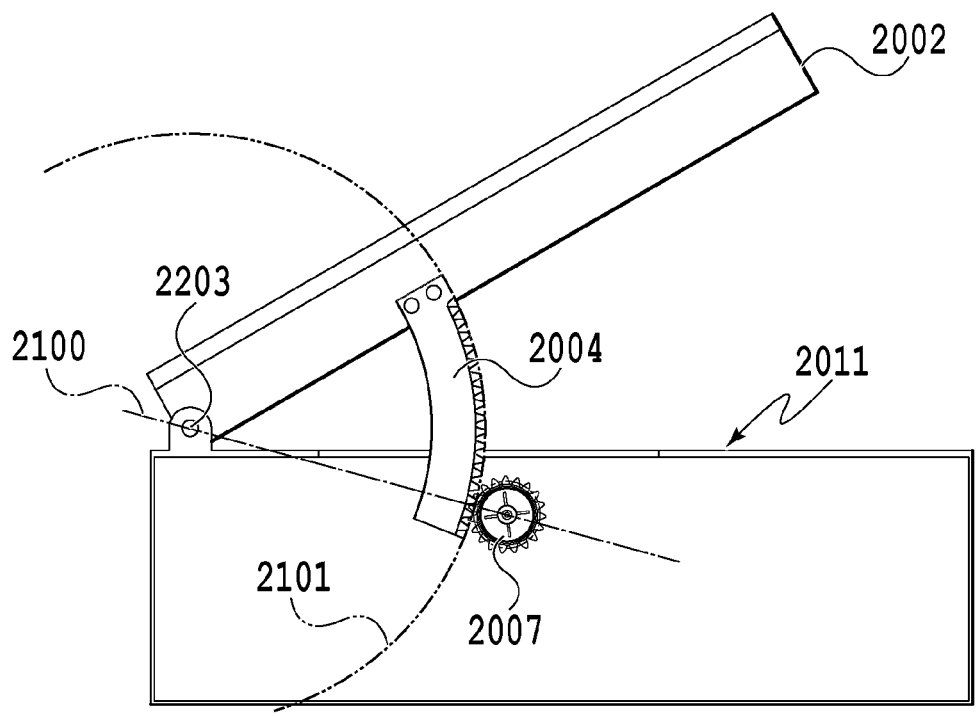
FIGS. 22A and 22B are side views schematically showing gear mesh in a conventional printing apparatus.
Figure 22B:
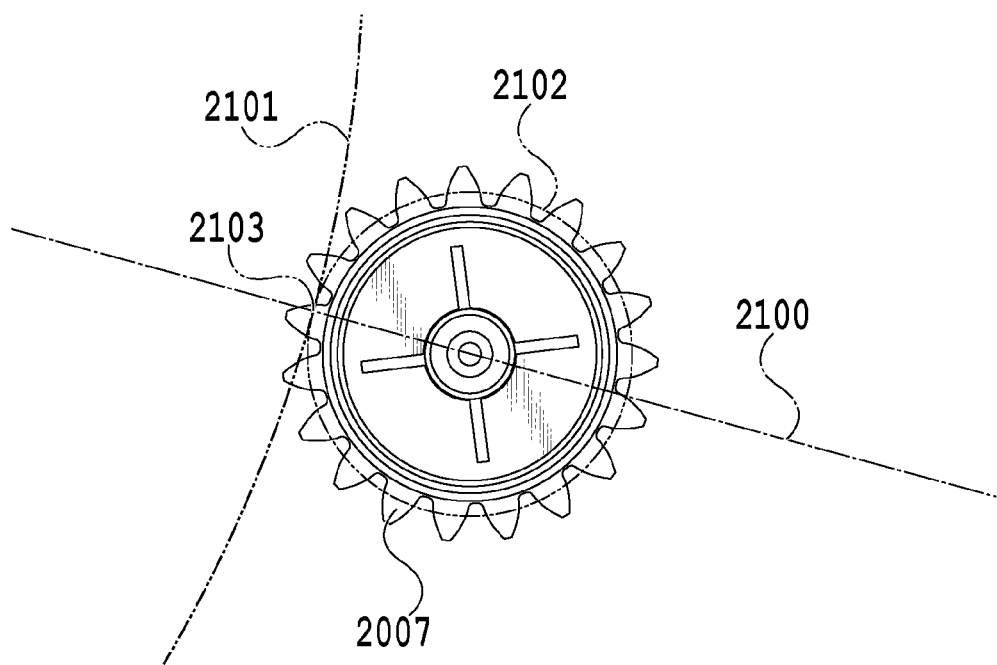

In order to clarify a difference between the present embodiment and a conventional image printing and scanning apparatus, a damper mechanism of opening/closing a scanner unit 2002 provided in the conventional image printing and scanning apparatus and its problem to be solved will be described. FIG. 22A is a view schematically showing the damper mechanism of opening/closing the image reader disclosed in the above-described Japanese Patent Laid-Open No. 2007-0251934 and FIG. 22B is a view enlarging the surroundings of a pinion gear 2007 of FIG. 22A.

On the upper face of the back face side of a printer body unit 2011, the scanner unit 2002 is rotatably (openably/closably) provided with a center on a rotation center 2203. In the scanner unit 2002, one end of a rack gear 2004 of an arc shape is fixed with a screw. The center of a pitch circle 2101 of the rack gear 2004 is identical to the rotation center 2203 of the scanner unit 2002. The rack gear 2004 is rotatably supported by the printer body unit 2011 which includes a printer engine, and is in mesh with the rack gear 2004. It should be noted that a dot and dash line 2100 indicates a straight line connecting the rotation center 2203 of the scanner unit 2002 and the rotation center of the pinion gear 2007.

As such, the pinion gear 2007 and the rack gear 2004 of a fixed type are used for the conventional damper mechanism. Due to the movement of opening/closing (rotating) the scanner unit 2002, the rack gear 2004 behaves as if it is part of a gear rotating about the rotation center 2203 of the scanner unit 2002. In other words, the pitch line of the rack gear 2004 moves along the pitch circle 2101.

A pitch point 2103 which is a central point of the mesh between the pinion gear 2007 and the rack gear 2004 is fixed except a backlash for guaranteeing the movement. The pitch point 2103 is positioned on a straight line connecting the centers of the pitch circles of the pinion gear 2007 and rack gear 2004, that is, the straight line 2100 connecting the center of the pinion gear 2007 and the rotation center 2203 of the scanner unit 2002. Accordingly, the pitch point 2103 will not move depending on opening/closing angles of the scanner unit 2002.

Thus, in order to keep the rack gear 2004 fixed to the scanner unit 2002 that makes opening/closing movement to be constantly and stably in mesh with the pinion gear 2007 provided in the printer body unit 2011, various restrictions occur in designing. For instance, there may be needs to set the pitch line of the rack gear 2004 to be in a circular shape and to set the diameter of the rack gear 2004 to a length that is in mesh with the pinion gear 2007. In a case where these conditions are not satisfied, the pitch line of the rack gear 2004 does not pass through a certain position with respect to the printer body unit 2011, thereby causing failure in the mesh between the rack gear 2004 and the pinion gear 2007 or resulting in interference therebetween.

Moreover, the rack gear 2004 needs to have a certain extent of width for ensuring rigidity that is sufficient to retain a gear shape. Further, there is also a need to set a length of the rack gear 2004 in its height direction so as to hold the scanner unit 2002 in the open position. However, in the case where the rack gear 2004 is widely formed and its length in the height direction is elongately formed, a space for accommodating the rack gear must be formed inside the printer body unit 2011, thereby possibly increasing the size of the apparatus. In other words, in the conventional damper mechanism, a shape and size of the rack gear 2004 need to be determined by considering, for example, the rigidity of the rack gear 2004, the opening amount of the scanner unit 2002, and the size of the body part.

However, since the rack gear 2004 is fixed to the scanner unit 2002, the rack gear 2004 also moves, upon opening/closing the scanner unit 2002, by an angle identical to the opening/closing angle of the scanner unit 2002. For this reason, in a case where the scanner unit 2002 moves to the closed position, a height component of an occupying area of the rack gear 2004 cannot be expected to decrease.

In addition, the damper mechanism should desirably be configured so as to rotate the scanner unit 2002 with a force as small as possible while generating the braking force in terms of favorable operability and cost improvement. Accordingly, the pitch line is conventionally arranged at a portion as far as possible from the rotation center. However, this means that the pitch circle of the rack gear should be enlarged, and for enlarging the pitch circle, the body part for accommodating the rack gear 2004 is required to be enlarged. Therefore, the size of the pitch circle is restricted by the size of the printer body unit 2011. As such, if the setting for a diameter of the pitch circle of the rack gear 2004 is changed, the cost increase for increasing the size of the printer body unit 2011 and for changing materials would be of a concern.

In contrast, in the present embodiment, the configuration as described above can resolve all the problems of the above conventional technique. In other words, according to the present embodiment, flexibility for a position, angle, and variable range of the rack gear 4 can be enhanced, thereby reducing restrictions in designing the printing apparatus.

Also, in order to release the mesh at the time of closing the scanner unit 2 as described above, a non-mesh portion 406 in which teeth are removed as shown in FIGS. 13A and 13B is formed. Just by adding a gear part to this non-mesh portion and extending the length of the rack part 307, braking release timing can be adjusted. Accordingly, a shape (arc shape) that guarantees gear mesh by adding teeth on an extendable portion of the rack part 403 is formed.

As shown in FIGS. 13A, 13B, FIG. 14, or FIG. 15A to 15C, in order to stabilize the mesh between the teeth (rack part) of the rack gear 4 and the teeth of the pinion gear 7, it is desirable that the rack gear 4 moving together with the scanner unit 2 be guided to a position that engages the pinion gear 7. In other words, while the scanner unit 2 moves from the closed position to the open position, the rack gear 4 is guided by a guiding part (sliding shaft 504) provided in the printer body unit 11 side.

Depending on the setting of a rotating angle of the scanner unit 2 or a position to hold the scanner unit 2, the size of the component, in particular, the rack gear 4 connecting between the scanner unit 2 and the printer body unit 11 may be elongated. However, according to the present embodiment, since there is flexibility for a setting position of the pitch point, it is possible to set a moving position or moving direction of the rack gear 4 so that the rack gear 4 moves to a position that does not affect the size of the printer body unit 11 or to a position where no interference with other units occurs. In the example shown in FIGS. 13A and 13B, at the time of closing the scanner unit 2, a tip end of the rack gear 4 moves as if to swing in the D direction and the rack gear 4 is changed to be in an orientation having an angle close to horizontal position. More specifically, an orientation of the rack gear 4 viewed from the lower face (bottom part) of the scanner unit 2 is in a more laid-down state in the case where the scanner unit 2 is closed with respect to the printer body unit 11 rather than in the case where the scanner unit 2 is opened with respect to the printer body unit 11, and an entering amount to a downward gravity direction becomes smaller than in the conventional case. In other words, an orientation of the rack gear 4 viewed from the lower face of the scanner unit 2 is in a more standing state in the case where the scanner unit 2 is opened with respect to the printer body unit 11 rather than in the case where the scanner unit 2 is closed with respect to the printer body unit 11. Accordingly, at the time of closing the scanner unit 2, a height component of an occupying area of the rack gear 4 entering the printer body unit 11 can be reduced compared to the conventional case, thereby achieving downsizing of the apparatus (making it thinner).

Moreover, the configuration of the present embodiment is effective in a case where parameters such as a position of the rotation center of the pinion gear 7, a diameter of the pitch circle of the pinion gear 7, a pitch point of a position in mesh, and an angle of the pitch line of the rack gear 4 in the pitch point are given. Since the pitch line 101 of the rack gear 4 is in an arc shape so as to be convex with respect to the center of the pinion gear 7, the rack gear 4 becomes closer to a horizontal state so as to further achieve a thinner apparatus.

Furthermore, as shown in FIG. 13B, since the rack gear 4 moves to a front face direction (D direction) of the printer body unit 11, the interference between the rack gear 4 and a wiring group can be avoided even if the wiring group such as a power supply cable and a signal line is arranged in an area 104 at the back face side of the printer body unit 11.

As such, according to the present embodiment, a variable range of the rack gear 4 can be set by considering its positional relation with the other parts. Accordingly, if the size of the rack gear 4 is to be increased, a necessity to increase the size of the printer body unit 11 and the other units for avoiding the interference with the rack gear 4 will be reduced.

MODIFIED EXAMPLES

Next, modified examples in the above-described first embodiment will be described. FIGS. 17A and 17B to FIGS. 20A and 20B are side views schematically showing first to fourth modified examples. These modified examples include rack gears 4 of different shapes in place of the rack gear 4 in the basic configuration of the damper mechanism described above.

First Modified Example

The first modified example will be described with reference to FIGS. 17A and 17B. The present modified example includes a rack gear 42 having a pitch line of a linear shape in place of the arc-shaped rack gear 4 provided in the basic configuration. In the rack gear 42, a shaft 421 provided at one end is rotatably inserted into the rotation hole 201 of the bearing part 200 provided in the scanner unit 2 and is supported thereby. In addition, a rack part 423 of the rack gear 42 is in mesh with the pinion gear 7 while being guided by the sliding shaft 504 provided in the printer body unit 11 side. As for other configurations, they are identical to the above-described basic configuration, and the same reference numerals are given for the same parts.

Figure 17A:
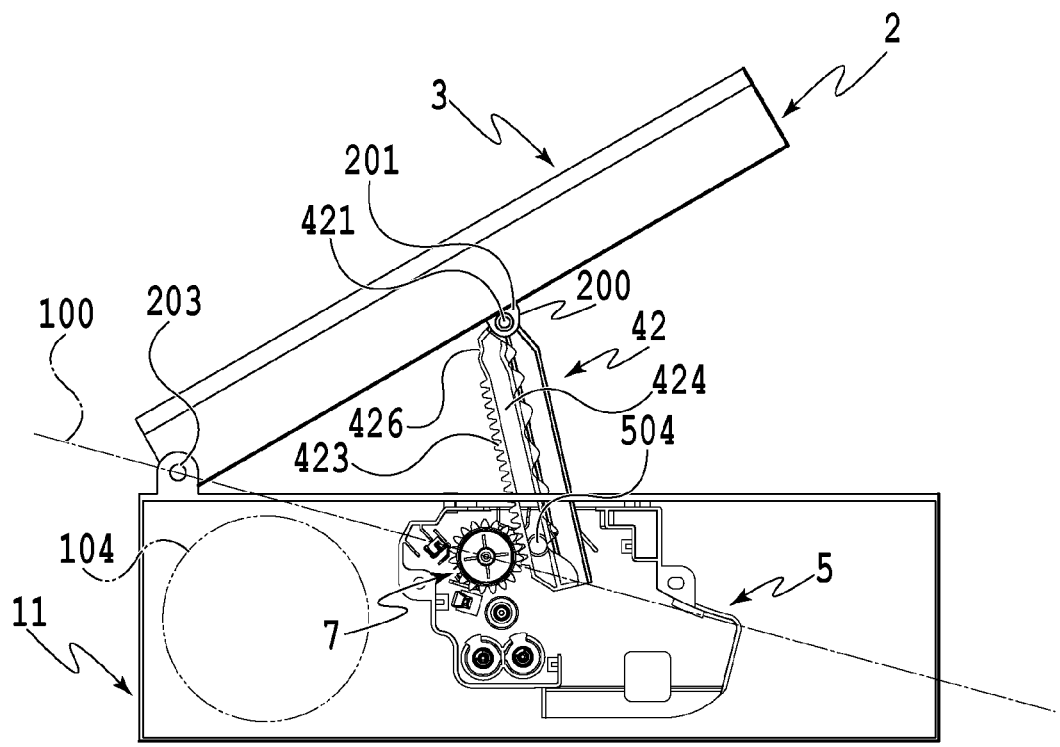
FIGS. 17A and 17B are side views showing a first modified example in the first embodiment.
Figure 17B:
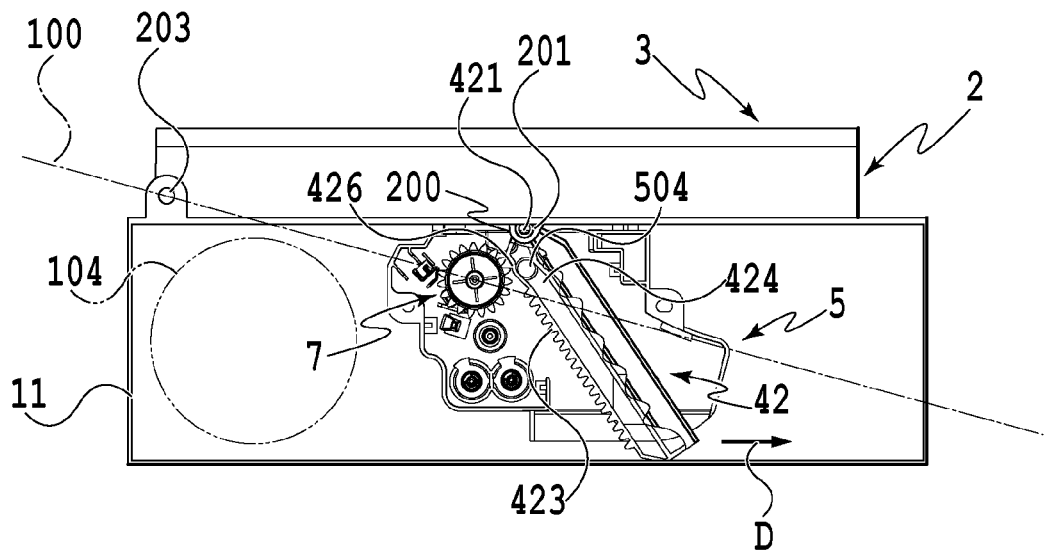

The rack gear 4, the shaft 401, the rack part 403, the groove 404, and the non-mesh portion 406 shown in FIGS. 13A and 13B are replaced with and read as the rack gear 42, the shaft 421, the rack part 423, a groove 424, and a non-mesh portion 426, respectively, as shown in FIGS. 17A and 17B. In this regard, the first modified example is identical to the basic configuration.

Second to Fourth Modified Examples

Figure 18A:
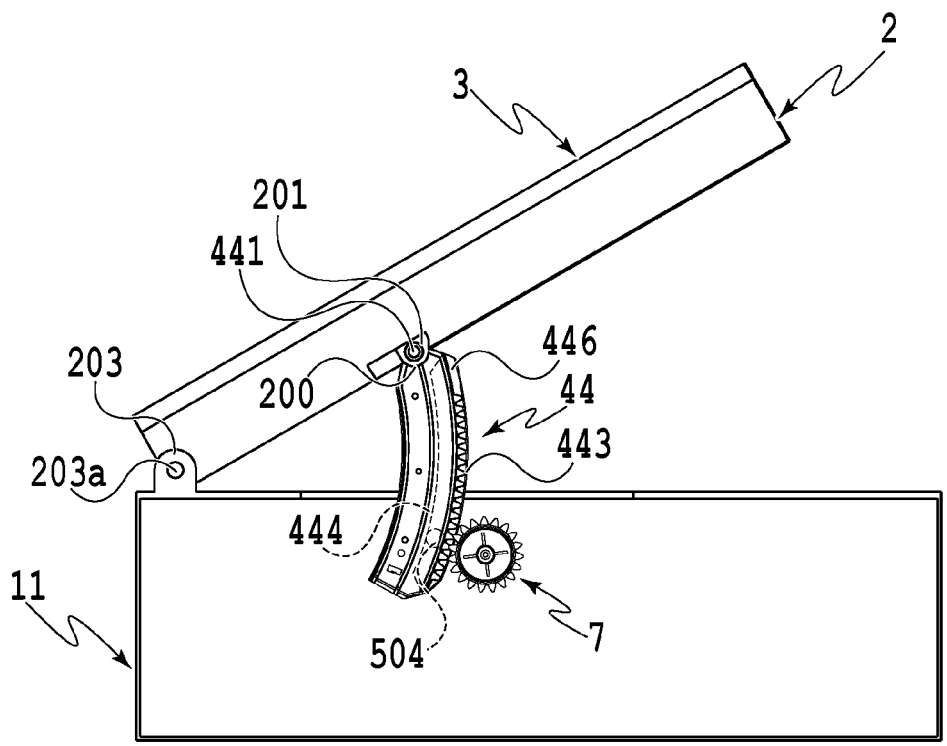
FIGS. 18A and 18B are side views showing a second modified example in the first embodiment.
Figure 18B:
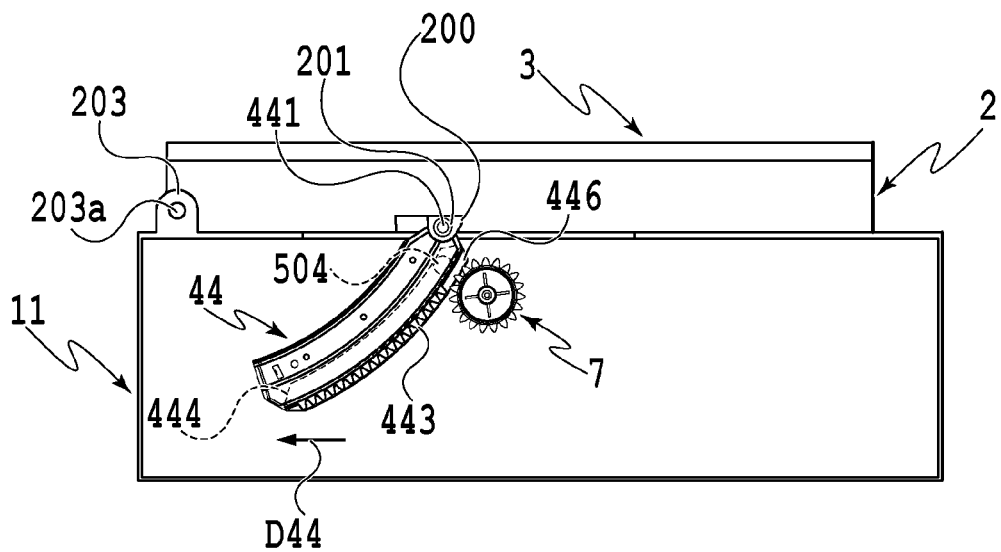

FIGS. 18A and 18B are views showing the second modified example. In the above-described basic configuration shown in FIGS. 13A and 13B, the rack gear 4 is in mesh with the upper right side of the pinion gear 7, whereas a rack gear 44 in the present modified example is in mesh with the teeth on an upper left side of the pinion gear 7 as in FIGS. 18A and 18B. This aspect is different from the basic configuration. In addition, the pitch line of the rack gear 44 has an arc shape as in the basic configuration, but the center of the arc shape is positioned at the front side of the rotation center of the pinion gear 7 in the basic configuration, whereas the center is positioned at the rear side (back face side) in the present modified example. This is another difference between the present modified example and the basic configuration.

By moving the scanner unit 2 from the open position shown in FIG. 18A to the closed position shown in FIG. 18B, the rack gear 44 moves on while its groove 444 is guided by the sliding shaft 504. As a result, the rack gear 44 rotates about a shaft 441 which is inserted into the rotation hole 201 in a direction (direction indicated with arrow D44) different from the moving direction of the scanner unit 2. Other aspects are the same as the basic configuration in FIGS. 13A and 13B, and the rack gear 4, the shaft 401, the rack part 403, the groove 404, and the non-mesh portion 406 should be replaced with and read as the rack gear 44, the shaft 441, a rack part 443, the groove 444, and a non-mesh portion 446, respectively, as in FIGS. 18A and 18B.

Figure 19A:
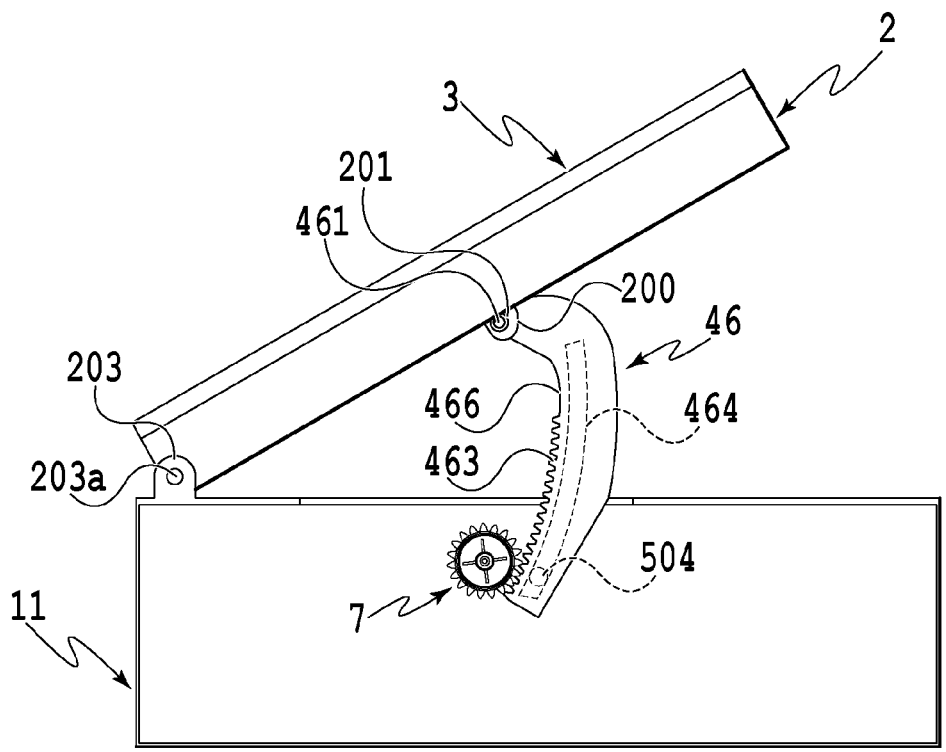
FIGS. 19A and 19B are side views showing a third modified example in the first embodiment.
Figure 19B:
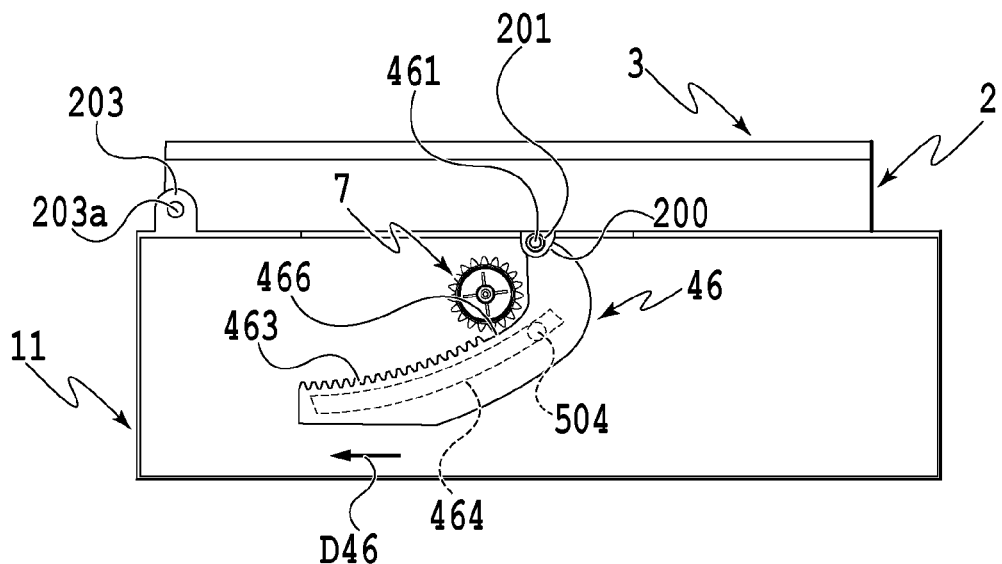

As to the third modified example shown in FIGS. 19A and 19B, the rack gear 4, the shaft 401, the rack part 403, groove 404, and the non-mesh portion 406 of the above-described basic configuration should be replaced with and read as a rack gear 46, a shaft 461, a rack part 463, a groove 464, and a non-mesh portion 466, respectively.

In the third modified example, by moving the scanner unit 2 from the open position shown in FIG. 19A to the closed position shown in FIG. 19B, the rack gear 46 moves on while its groove 464 is guided by the sliding shaft 504. As a result, the rack gear 46 rotates about the shaft 461 which is inserted into the rotation hole 201 in a direction (direction indicated with arrow D46) different from the moving direction of the scanner unit 2.

Figure 20A:
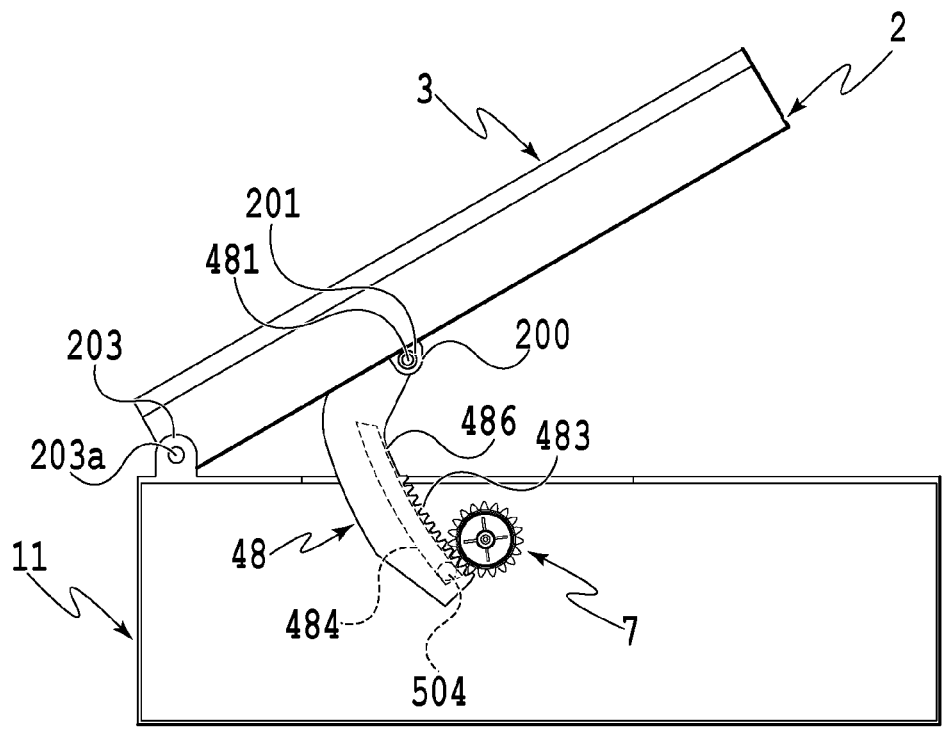
FIGS. 20A and 20B are side views showing a fourth modified example in the first embodiment.
Figure 20B:
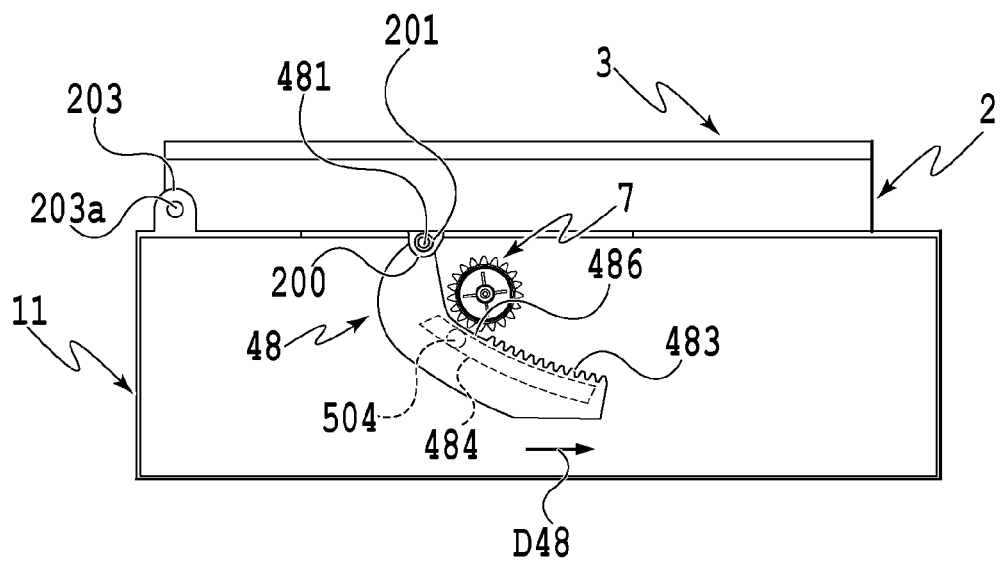

FIGS. 20A and 20B are views showing the fourth modified example. In this modified example as well, each part of the basic configuration, that is, 4, 401, 403, 404, and 406 should be replaced with and read as a rack gear 48, a shaft 481, a rack part 483, a groove 484, and a non-mesh portion 486, respectively, for describing the example as in the basic configuration.

In the fourth modified example, by moving the scanner unit 2 from the open position shown in FIG. 20A to the closed position shown in FIG. 20B, the rack gear 48 moves on while its groove 484 is guided by the sliding shaft 504. As a result, the rack gear 48 rotates about the shaft 461 which is inserted into the rotation hole 201 in a direction (direction indicated with arrow D48) different from the moving direction of the scanner unit 2.

As described above, in the first to fourth modified examples having shapes different from the basic configuration, along with the movement of opening/closing (rotating) the scanner unit 2, the rack gear can retain the mesh with the pinion gear while making rotational movement around the shaft 461 which is inserted into the rotation hole 201. As such, depending on a positional relation with the other components, it is possible to appropriately adopt a configuration such as the basic configuration or the first to fourth modified examples, thereby significantly improving flexibility in designing.

As described above, according to the first embodiment, by rotatably holding the rack gear with respect to the scanner unit, flexibility for the movement of the rack gear is enhanced so as to suppress the interference between the rack gear and the other units and the expansion of a range of the rack gear movement. Accordingly, it is possible to provide a scanning and printing apparatus of a compact type having a buffer device of high movement reliability at low cost.

Second Embodiment

Figure 21A:
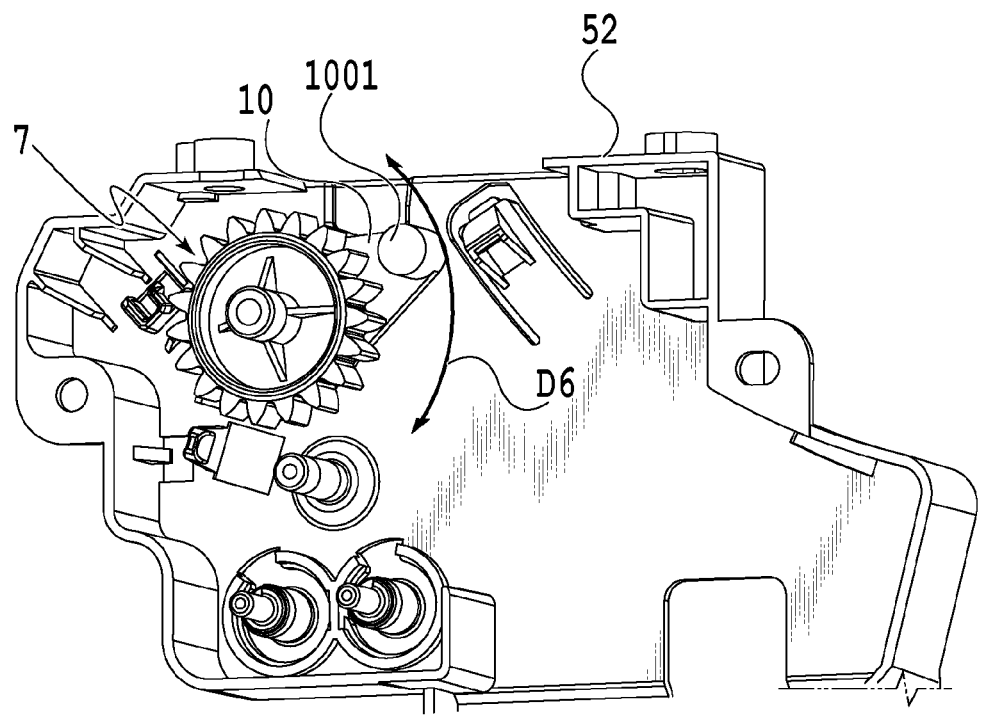
FIGS. 21A and 21B are perspective views showing major parts according to a second embodiment of the present invention.
Figure 21B:
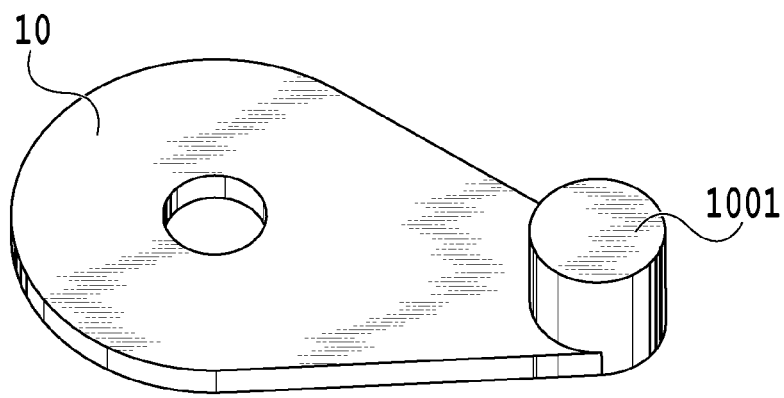

Next, the second embodiment of the present invention will be described. FIGS. 21A and 21B are views showing major components of the damper mechanism in the second embodiment. FIG. 21A is a view showing a state in which the pinion gear 7 and a shaft holder 10 (rotation member) in the damper mechanism are attached within a gear base 52, and FIG. 21B is a view showing a configuration of the shaft holder 10 of FIG. 21A.

In the second embodiment, in place of the gear base 5 shown in the first embodiment, the gear base 52 is provided on a casing member of a printer body unit (not shown in FIGS. 21A and 21B). In the gear base 52, the pinion gear 7 and the shaft holder 10 are rotatably supported by a shaft provided in the gear base 52 on the same rotation center axis line. At one end of the shaft holder 10, a sliding shaft (shaft-shaped engagement part) 1001 is protrudingly provided.

The sliding shaft 1001 is rotatable around an axis identical to the rotation center axis of the pinion gear 7 in a track indicated with arrow D6 in FIG. 21A. In other words, the sliding shaft 1001 moves while keeping a constant distance between the rotation center of the pinion gear 7 and the sliding shaft 1001. The sliding shaft 1001 is, similar to the sliding shaft 504 in the first embodiment, slidably and rotatably engaged with a groove (for example, the groove 404 shown in FIG. 4) of a non-illustrated rack gear. Due to this configuration, the mesh between the rack gear and the pinion gear 7 can be guaranteed. In other words, the sliding shaft provided on the printer body unit side may have a configuration in which the sliding shaft is not fixed on the printer body unit side as long as a distance between a pinion shaft center and the sliding shaft is configured to be constantly kept.

According to each of the above embodiments, the scanner unit rotatably connected to the printer body unit is held by the damper mechanism including the rack gear and the pinion gear, and thus impact at the time of opening/closing the scanner unit can be alleviated so as to achieve smooth opening/closing movement. The rack gear is attached to have flexibility so as to be swingable (rotatable) with respect to the scanner unit, and a track of the rack gear movement is different from that of the scanner unit. Accordingly, upon closing the scanner unit, a range of movement of the rack gear in the gravity direction which enters the printer body unit can be suppressed and physical interference between various components and units inside the printer body unit and the rack gear can be easily avoided. In other words, it is possible to enhance flexibility of designing in seeking for making thinner apparatuses. As such, the smooth opening/closing movement of the scanner unit and the downsizing of the apparatus can be achieved simultaneously to realize an excellent printing apparatus.

Other Embodiments

According to each of the embodiments described above, the scanner unit rotatably connected to the printer body unit is configured to be held by the rack gear and the pinion gear. However, the present invention is not limited to this, and it is possible to achieve a function equivalent to that of the rack gear by using a configuration other than the rack gear. For instance, in place of the rack gear used in the second embodiment, a link member and a circular gear may be used. In this case, one end of the link member is rotatably connected to the printer body unit, and at the other end of the link member, a second gear member which is a circular gear that can be in mesh with the pinion gear (first gear member) is to be rotatably provided. Further, similar to the shaft holder of the second embodiment, a guide member that is rotatable around a center identical to that of the pinion gear is provided. By connecting rotation center axes of the guide member and the second gear member, the mesh between the second gear member and the pinion gear is to be retained. In such a configuration, the same function and effect as those of the second embodiment can be achieved.

Moreover, the present invention has been described by way of example of the printing apparatus in which the scanner unit is openably/closably provided on the printer body unit, but the present invention is not limited to this. The present invention is applicable to all printing apparatuses that openably/closably provides an opening/closing unit on the printer body unit. Specifically, a first gear member such as the pinion gear is provided on the printer body unit of the printing apparatus, while in the opening/closing unit, a second gear member such as the rack gear swingably connected around a predetermined rocking fulcrum is provided so as to be in mesh with the first gear member. Then, if a relative position between the second gear member and the scanner unit from the center of the rocking fulcrum is to be varied along with the opening/closing movement of the opening/closing unit, it is possible, as in the above embodiments, to suppress the interference between the second gear member and the other units and the expansion of a range of the second gear member movement. Accordingly, it is possible to enhance flexibility in designing and simultaneously provide a compact printing apparatus having a buffer device of high movement reliability at low cost.

Furthermore, according to each of the embodiments described above, a groove (groove-shaped engagement part) is provided on the rack gear which is the second gear member, while providing a shaft-shaped engagement part (sliding shaft) slidably and rotatably engaged with the groove on the printer body unit side, thereby providing the guide mechanism of the second gear member. However, it may be configured that the shaft-like engagement part is provided on the second gear member and a groove-like engagement part may be provided on the printer body unit side. In other words, it is also possible to form the guide mechanism by providing the shaft-like engagement part on either one of the printer body unit and the second gear member and by providing the groove-like engagement part on the other.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-153709 filed Aug. 8, 2017, which is hereby incorporated by reference wherein in its entirety.

What is claimed is:

1. A printing apparatus comprising:
a printer body unit;
a scanner unit having an open state in which a front face-side of the scanner unit is opened with respect to the printer body unit by a hinge provided on a back-face side of the printing apparatus and a closed state in which the front-face side of the scanner unit is closed with respect to the printer body by the hinge;
a first gear member provided in the printer body unit; and
a second gear member provided with a plurality of teeth along a longitudinal direction of the second gear member, the second gear member meshing with the first gear,
wherein, in the longitudinal direction of the second gear member, one end of the second gear member is an attachment end and the other end of the second gear member is a distal end, the attachment end being attached to the scanner unit, the second gear member being configured to swing about the attachment end, and
wherein the distal end of the second gear member is configured to swing to the front-face side in a case where the scanner unit moves from the open state to the closed state such that an angle between the distal end of the second gear member and a lower face of the scanner unit in the closed state is smaller than an angle between the second gear member and the lower face of the scanner unit in the open state.

2. The printing apparatus according to claim 1, wherein a position of mesh between the first gear member and the second gear member (i) changes while the scanner unit opens or closes and (ii) does not pass a line connecting a rotation center of the scanner unit and a rotation center of the first gear member.

3. The printing apparatus according to claim 2, wherein the position of the mesh moves within a range by a half tooth or more in a circumferential direction of the first gear member.

4. The printing apparatus according to claim 1, wherein the first gear member is a pinion gear whose rotational axis is fixed at a position inside the printer body unit, and the second gear member is a rack gear.

5. The printing apparatus according to claim 4, wherein the rack gear includes a rack part having a convexly curved shape, and the plurality of teeth along the longitudinal direction of the second gear member are teeth of the rack part.

6. The printing apparatus according to claim 4, wherein the rack gear includes a rack part having a linear shape, and the plurality of teeth along the longitudinal direction of the second gear member are teeth of the rack part.

7. The printing apparatus according to claim 1, further comprising a guide mechanism that guides movement of the second gear member such that the second gear member moves while retaining a meshing state with the first gear member and the scanner unit opens or closes.

8. The printing apparatus according to claim 7, wherein the guide mechanism is configured such that an engagement part provided on either one of the printer body unit and the second gear member and a guide part provided on the other one of the printer body unit and the second gear member are movably engaged with each other, and the engagement part moves while engaging with the guide part and the scanner unit opens or closes.

9. The printing apparatus according to claim 8, wherein the guide part has a shaft shape and is provided in the printer body unit, and the engagement part has a groove shape that movably engages the guide part and is provided on the second gear member.

10. The printing apparatus according to claim 7, wherein the guide mechanism comprises:

a rotation member rotatably provided, independent from the first gear member, in the printer body unit with a center on a rotation center axis identical to the first gear member;

a guide part provided on the second gear member; and an engagement part provided on the rotation member that movably engages the guide part, and wherein, while the scanner unit opens or closes, the engagement part moves while engaging the guide part and thus the second gear member moves while meshing the first gear member.

11. The printing apparatus according to claim 10, wherein the guide part has a shaft shape and is provided on the rotation member, and the engagement part has a groove shape that movably engages the guide part and is provided on the second gear member.

12. The printing apparatus according to claim 1, wherein a braking unit is configured to apply a braking force directly or indirectly and is provided on at least one of the first gear member and the second gear member.

13. The printing apparatus according to claim 12, wherein in a case where the scanner unit moves from the open state to the closed state, the braking unit applies a braking force to at least one of the first gear member and the second gear member, and in a case where the scanner unit moves from the open state to the closed state, the braking unit does not apply a braking force to at least one of the first gear member and the second gear member.

14. The printing apparatus according to claim 1, wherein the second gear member includes a non-mesh portion which releases meshing between the second gear member and the first gear member in the closed state.

15. A printing apparatus comprising:

a printer body unit;

an opening and closing unit provided on the printer body unit and having an open state in which a front-face side of the opening and closing unit is opened with respect to the printer body unit by a hinge provided on a back-face side of the printing apparatus and a closed state in which the front-face side of the opening and closing unit is closed with respect to the printer body by the hinge;

a first gear member provided in the printer body unit; and a second gear member provided with a plurality of teeth along a longitudinal direction of the second gear member, the second gear member meshing with the first gear, wherein, in the longitudinal direction of the second gear member, one end of the second gear member is an attachment end and the other end of the second gear member is a distal end, the attachment end being attached to the opening and closing unit, the second gear member being configured to swing about the attachment end, and wherein the distal end of the second gear member is configured to swing to the front-face side in a case where the opening and closing unit moves from the open state to the closed state such that an angle between the distal end of the second gear member and a lower face of the opening and closing unit in the closed state is smaller than an angle between the second gear member and a lower face of the opening and closing unit in the open state.

16. A printing apparatus comprising:

a printer body unit;

an opening and closing unit provided on the printer body unit and having an open state in which a front-face side of the opening and closing unit is opened with respect to the printer body unit by a hinge provided on a back-face side of the printing apparatus and a closed state in which the front-face side of the opening and closing unit is closed with respect to the printer body by the hinge;

a first gear member provided in the printer body unit; and a second gear member provided with a plurality of teeth along a longitudinal direction of the second gear member, the second gear member meshing with the first gear, wherein, in the longitudinal direction of the second gear member, one end of the second gear member is an attachment end and the other end of the second gear member is a distal end, the attachment end being attached to the opening and closing unit, the second gear member being configured to swing about the attachment end, and wherein the distal end of the second gear member is configured to swing to the front-face side in a case where the opening and closing unit moves from the open state to the closed state, a distance between the distal end of the second gear member and a lower face of the opening and closing unit, in a case where the opening and closing unit is in the closed state, is shorter than a distance between the distal end of the opening and closing unit and the lower face of the opening and closing unit in a case where the opening and closing unit is in the open state.

17. The printing apparatus according to claim 16, wherein a position of mesh between the first gear member and the second gear member (i) changes while the opening and closing unit opens or closes and (ii) does not pass a line connecting a rotation center of the opening and closing unit and a rotation center of the first gear member.

18. The printing apparatus according to claim 17, wherein the position of the mesh moves within a range by a half tooth or more in a circumferential direction of the first gear member.

19. The printing apparatus according to claim 16, wherein the first gear member is a pinion gear whose rotational axis is fixed at a position inside the printer body unit, and the second gear member is a rack gear.

20. The printing apparatus according to claim 19, wherein the rack gear includes a rack part having a convexly curved shape, and the plurality of teeth along the longitudinal direction of the second gear member are teeth of the rack part.

21. The printing apparatus according to claim 19, wherein the rack gear includes a rack part having a linear shape, and the plurality of teeth along the longitudinal direction of the second gear member are teeth of the rack part.

22. The printing apparatus according to claim 16, further comprising a guide mechanism that guides movement of the second gear member such that the second gear member moves while retaining a meshing state with the first gear member and the opening and closing unit opens or closes.

23. The printing apparatus according to claim 22, wherein the guide mechanism is configured such that an engagement part provided on either one of the printer body unit and the second gear member and a guide part provided on the other one of the printer body unit and the second gear member are movably engaged with each other, and
the engagement part moves while engaging with the guide part and the opening and closing unit opens or closes.

24. The printing apparatus according to claim 23, wherein the guide part has a shaft shape and is provided in the printer body unit, and the engagement part has a groove shape that movably engages the guide part and is provided on the second gear member.

25. The printing apparatus according to claim 22, wherein the guide mechanism comprises:
a rotation member rotatably provided, independent from the first gear member, in the printer body unit with a center on a rotation center axis identical to the first gear member;
a guide part provided on the second gear member; and
an engagement part provided on the rotation member that movably engages the guide part, and
wherein, while the opening and closing unit opens or closes, the engagement part moves while engaging the guide part and thus the second gear member moves while meshing the first gear member.

26. The printing apparatus according to claim 25, wherein the guide part has a shaft shape and is provided on the rotation member, and the engagement part has a groove shape that movably engages the guide part and is provided on the second gear member.

27. The printing apparatus according to claim 16, wherein a braking unit is configured to apply a braking force directly or indirectly and is provided on at least one of the first gear member and the second gear member.

28. The printing apparatus according to claim 27, wherein
in a case where the opening and closing unit moves from the open state to the closed state, the braking unit applies a braking force to at least one of the first gear member and the second gear member, and
in a case where the opening and closing unit moves from the closed state to the open state, the braking unit does not apply a braking force to at least one of the first gear member and the second gear member.

29. The printing apparatus according to claim 16, wherein the second gear member includes a non-mesh portion which releases meshing between the second gear member and the first gear member in the closed state.

30. A printing apparatus comprising:
a printer body unit;
an opening and closing unit provided on the printer body unit;
a first gear member provided in the printer body unit;
a second gear member provided with a plurality of teeth along a longitudinal direction of the second gear member, the second gear member meshing with the first gear member;
a guide part provided on the printer body unit and having a shaft shape; and
an engagement part provided on the second gear member and having a groove shape which is movably engaged to the guide part,
wherein, in the longitudinal direction of the second gear member, one end of the second gear member is an attachment end and the other end of the second gear member is a distal end, the attachment end being attached to the opening and closing unit, the second gear member being configured to swing about the attachment end, and
wherein a distance between the distal end of the second gear member and a lower face of the opening and closing unit, in a case where the opening and closing unit is in a closed state, is shorter than a distance between the distal end of the opening and closing unit and the lower face of the opening and closing unit in a case where the opening and closing unit is in an open state.

* * * * *